C. V. STRICKLAND.
TOBACCO STEMMING MACHINE.
APPLICATION FILED DEC. 7, 1905.
1,301,193.
Patented Apr. 22, 1919.
10 SHEETS—SHEET 3.
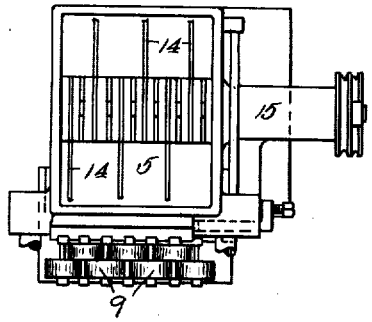
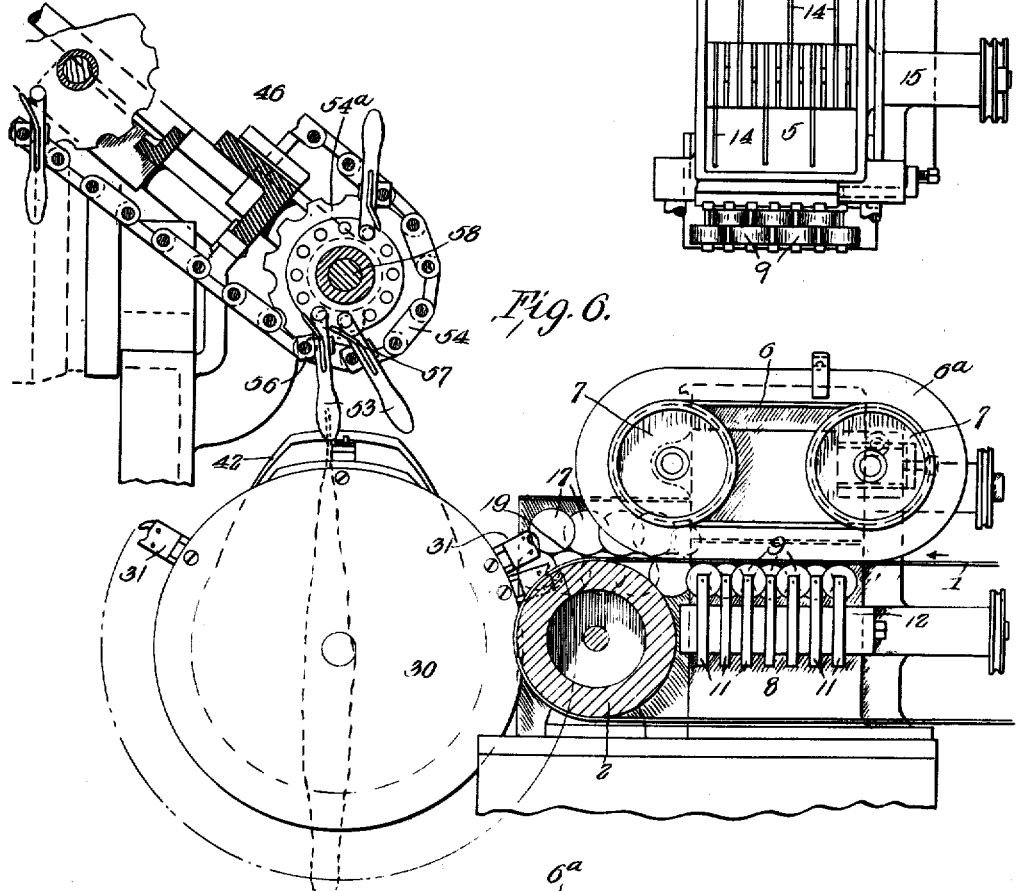
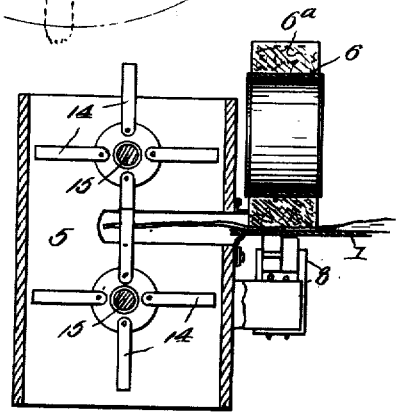
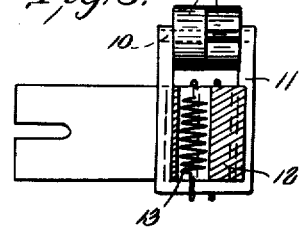
Charles V. Strickland
Inventor
By his Attorneys
Meyers, Cushman & Rea
Witnesses
Gertrude M. Stucker
John J. McCarthy

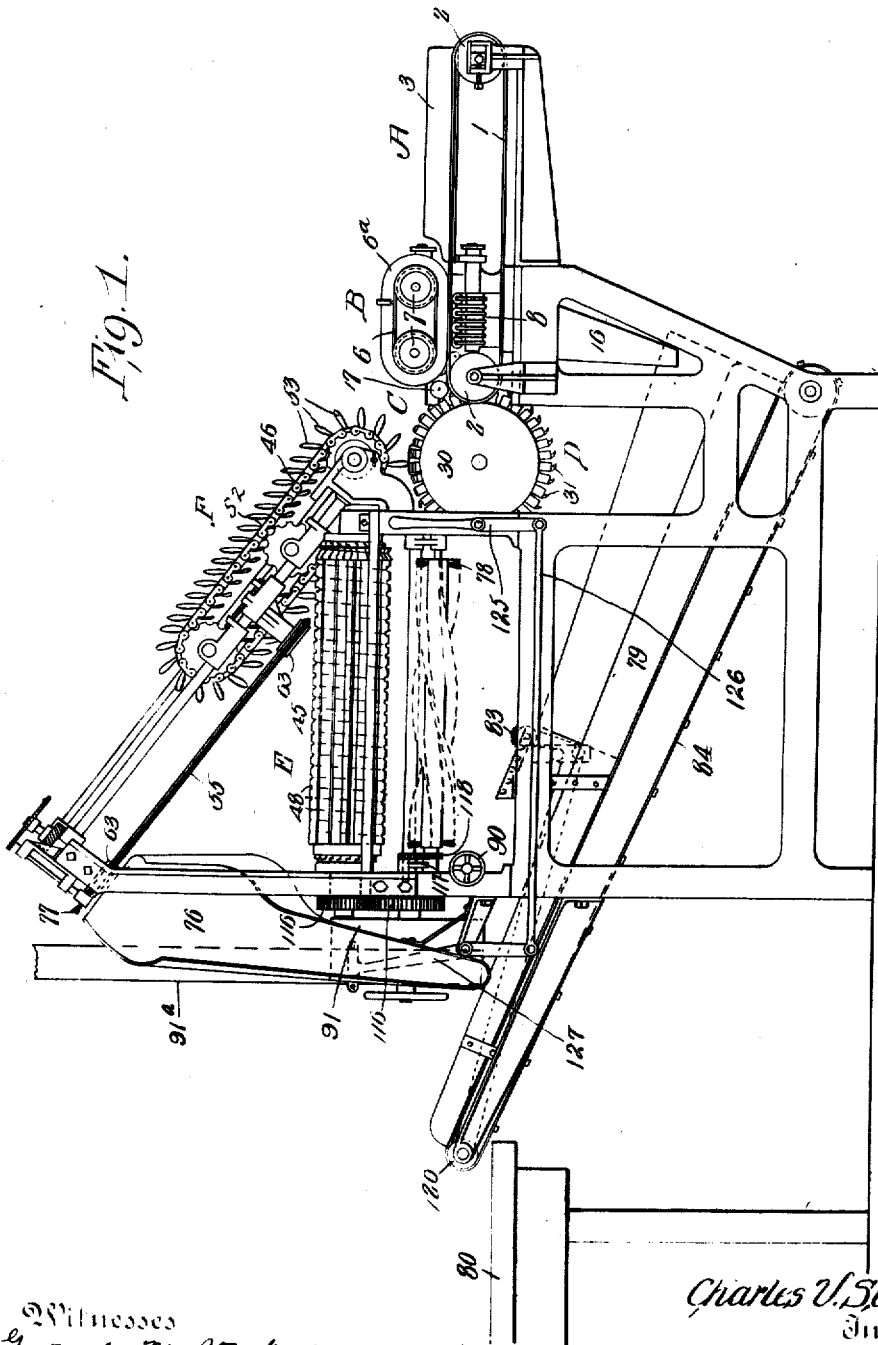

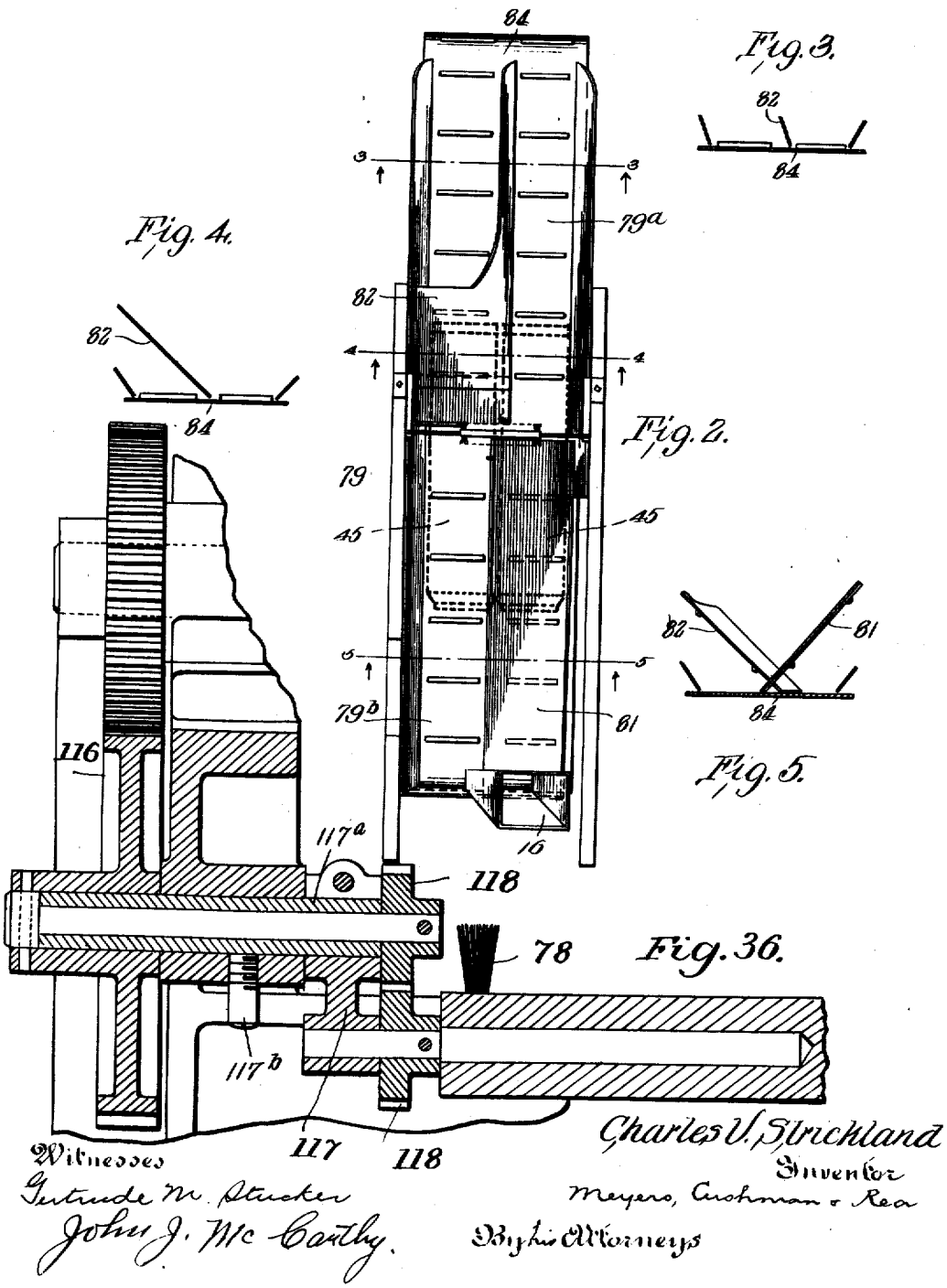

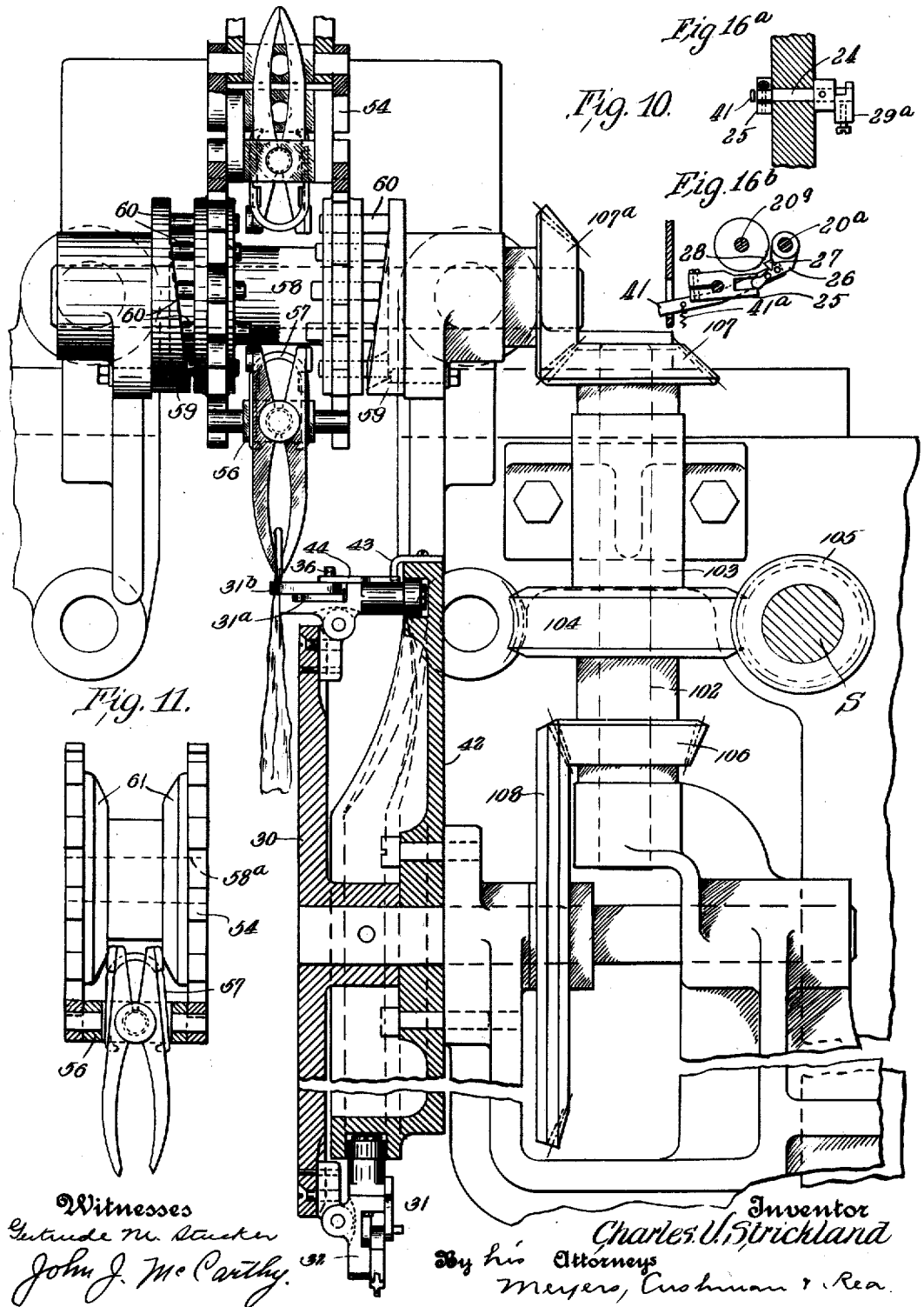

C. V. STRICKLAND.
TOBACCO STEMMING MACHINE.
APPLICATION FILED DEC. 7, 1905.
1,301,193.
Patented Apr. 22, 1919.
10 SHEETS—SHEET 5.
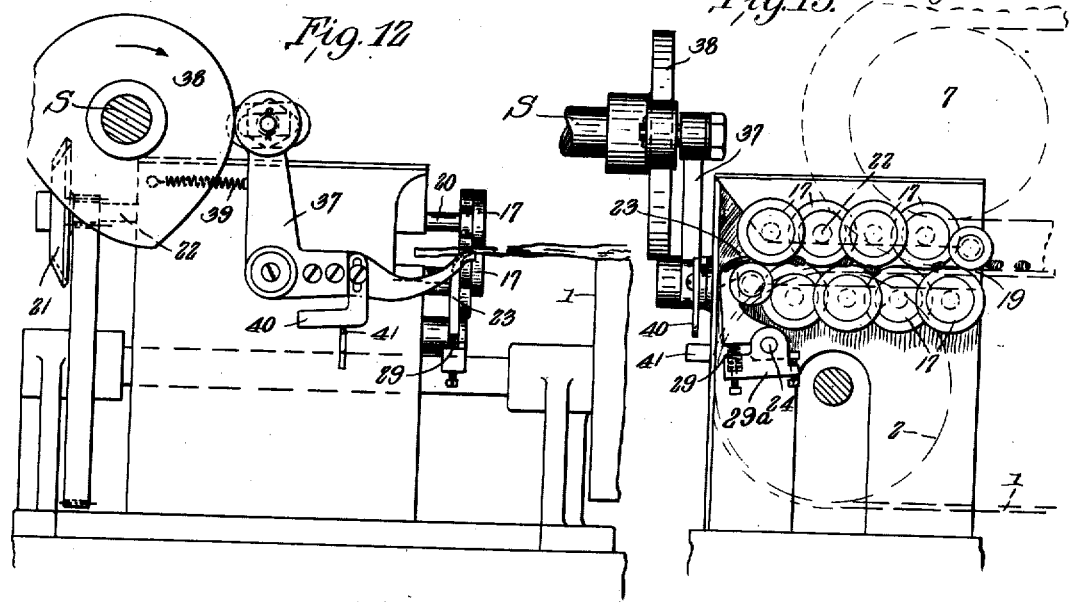
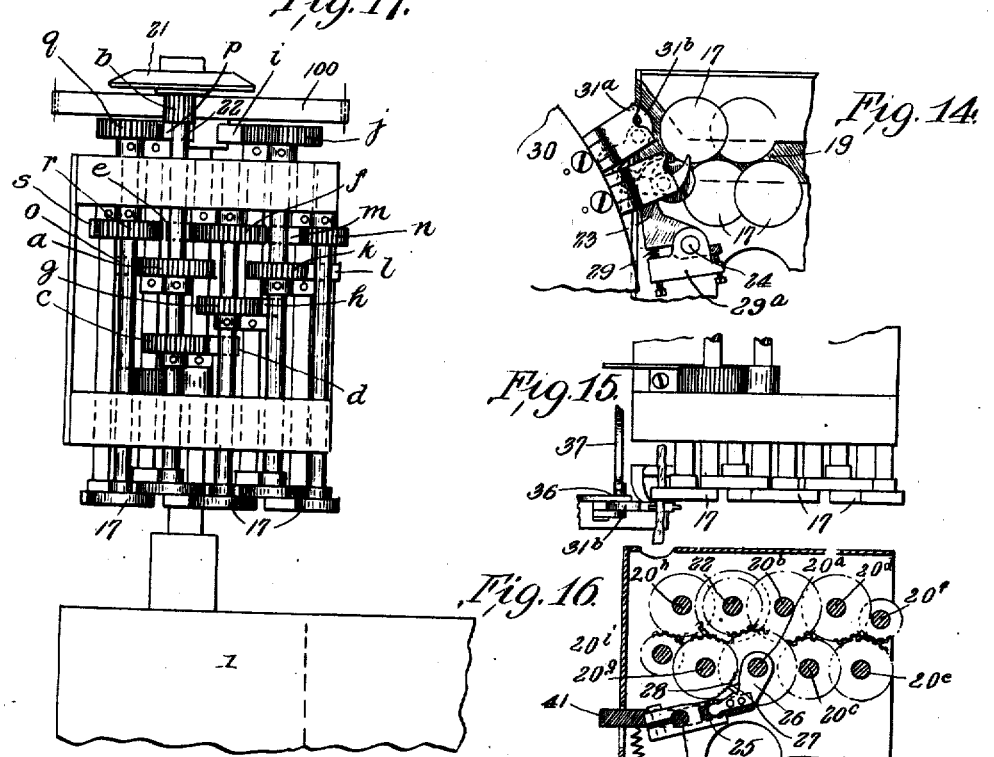
Witnesses
Gertrude M. Stucker
John J. McCarthy
Inventor
Charles V. Strickland
By his Attorneys Meyers, Cushman & Rea

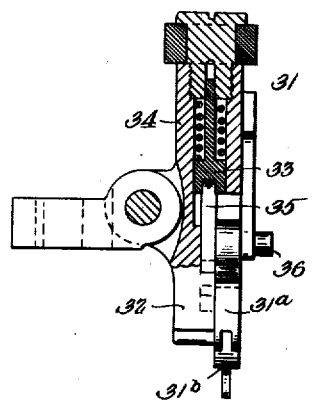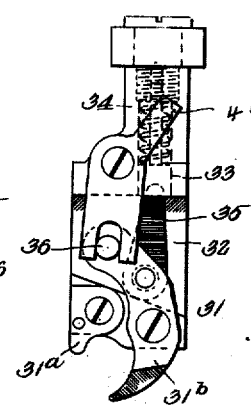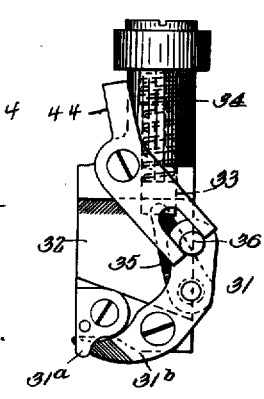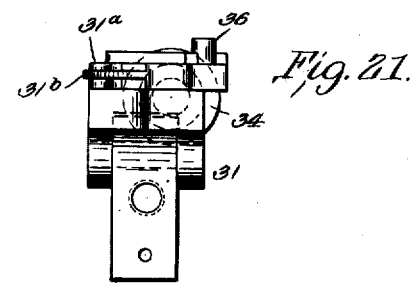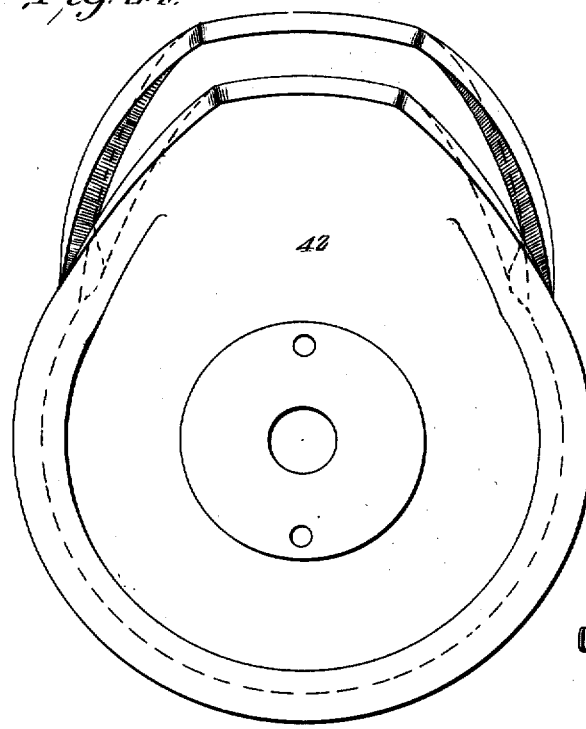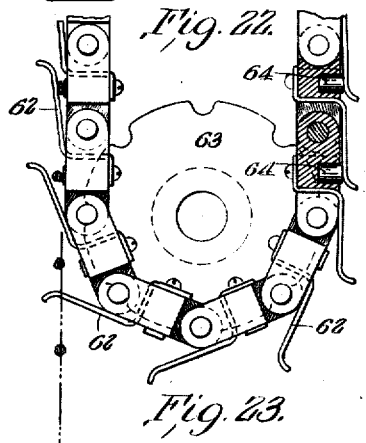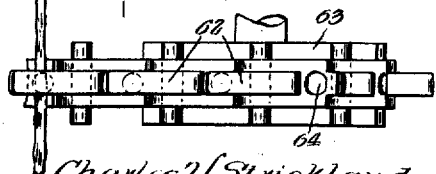

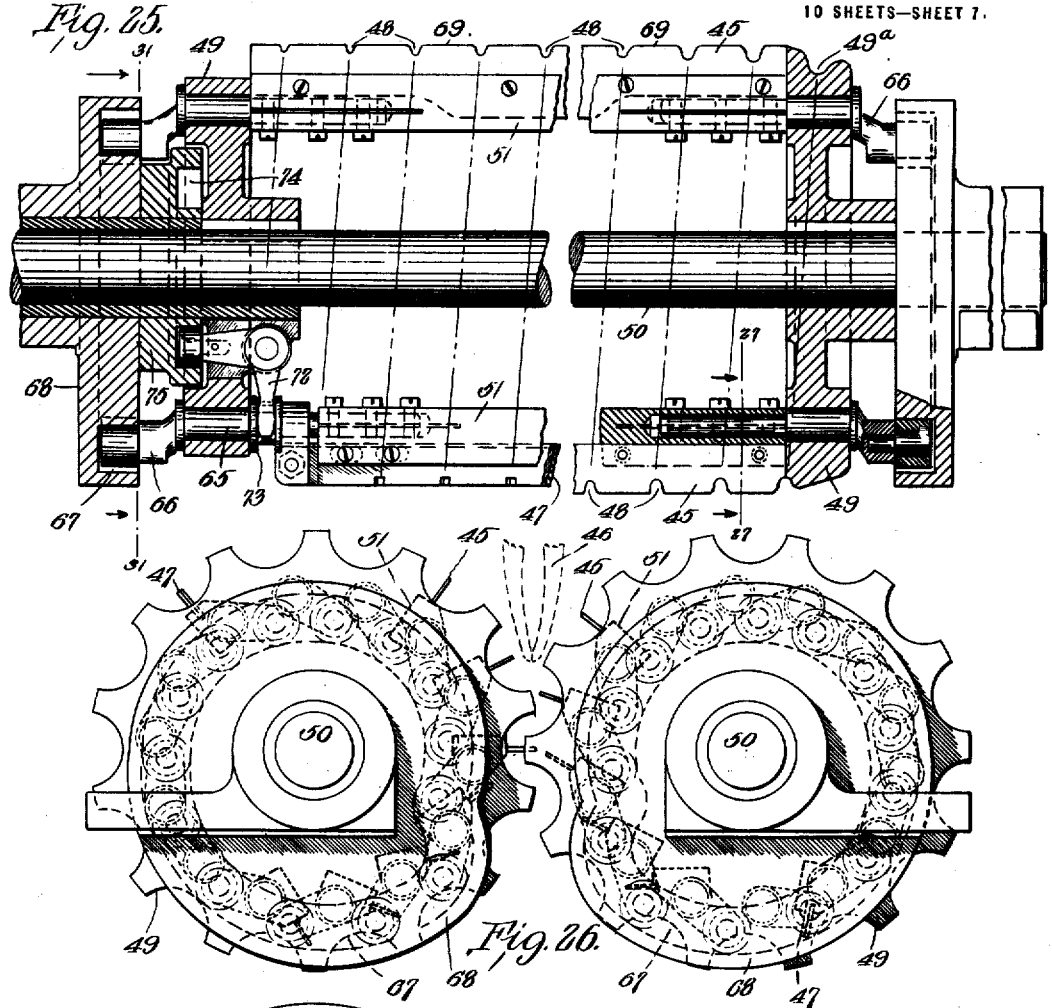

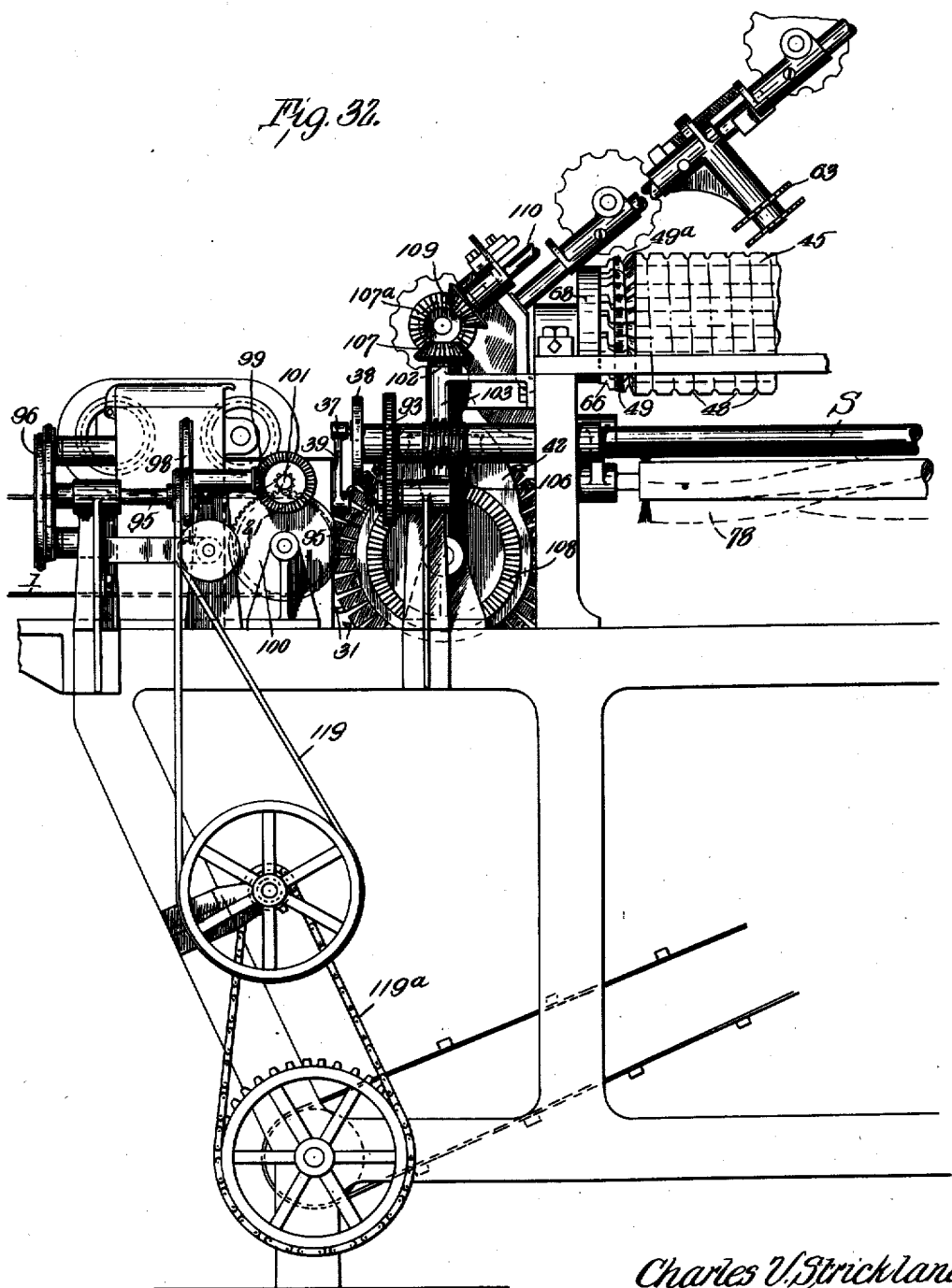

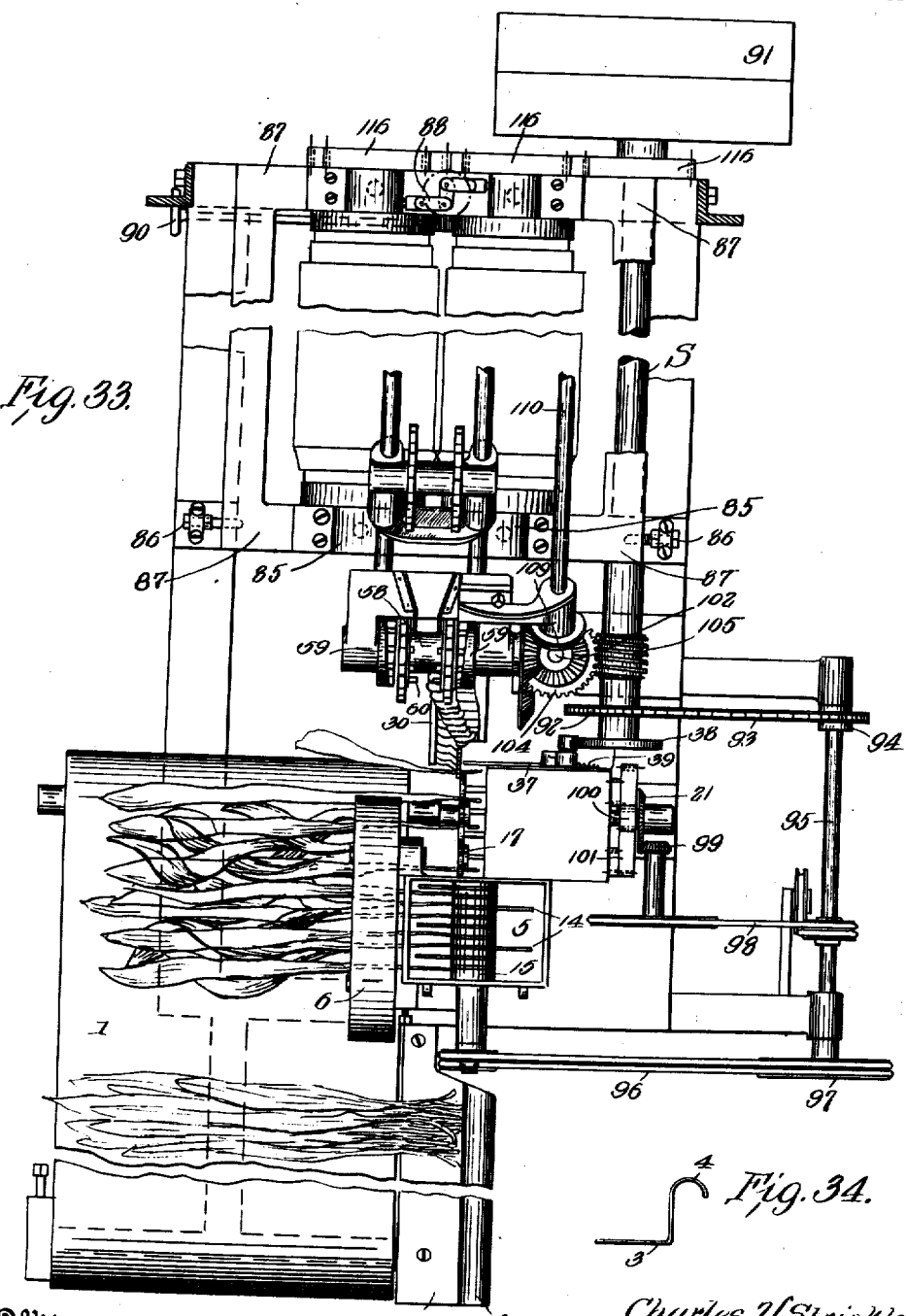

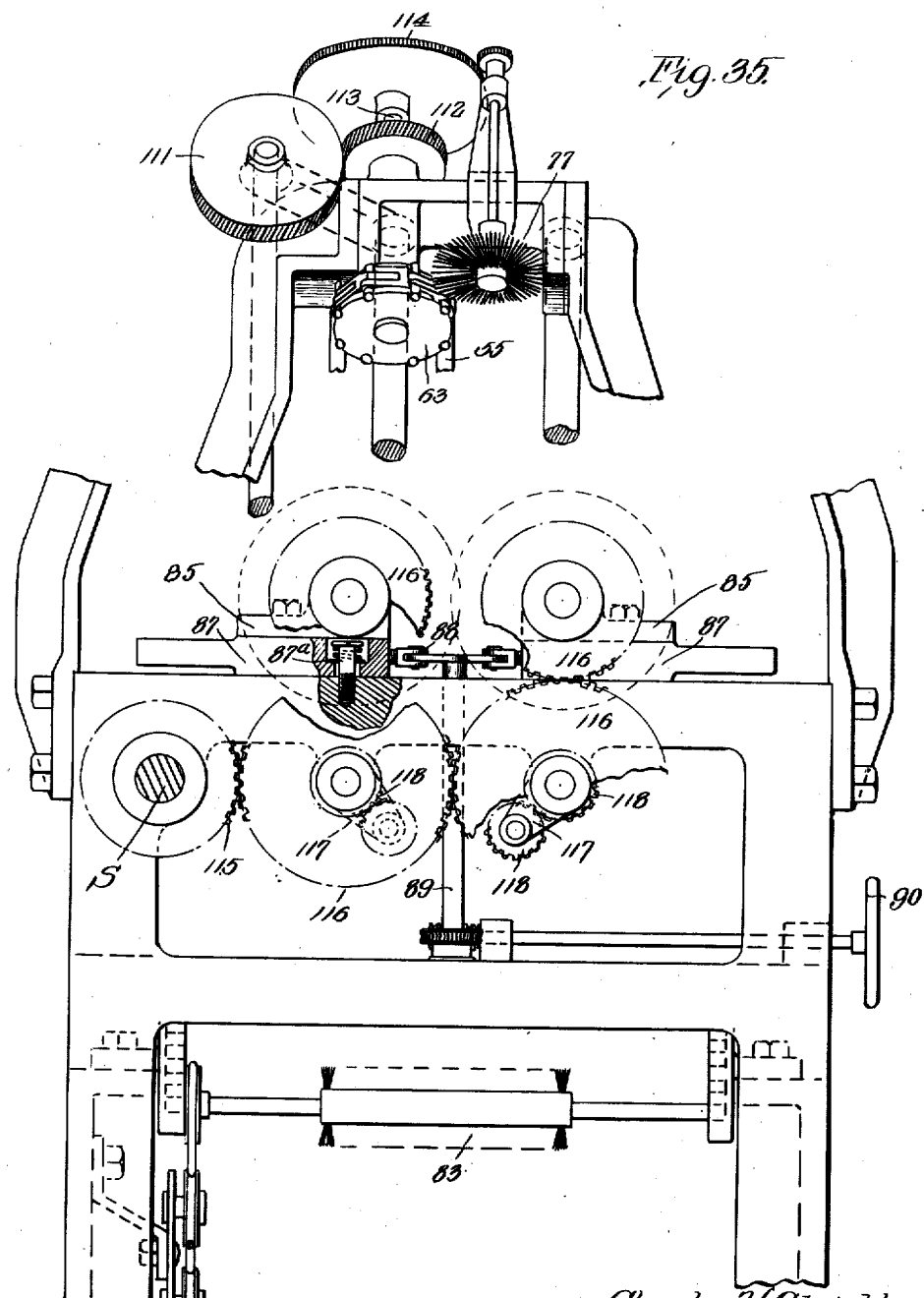

UNITED STATES PATENT OFFICE.

CHARLES V. STRICKLAND, OF BROOKLYN, NEW YORK.

TOBACCO-STEMMING MACHINE.

1,301,193.        Specification of Letters Patent.     Patented Apr. 22, 1919.

Application filed December 7, 1905. Serial No. 290,775.

*To all whom it may concern:*

Be it known that I, CHARLES V. STRICKLAND, a citizen of the United States, residing at Brooklyn, in the county of Kings and State of New York, have invented new and useful Improvements in Tobacco-Stemming Machines, of which the following is a specification.

This invention relates to an improvement in tobacco stemming machines having for its main object the production of a machine of greater capacity and efficiency than has heretofore been known. A further object is the production of a stemming machine in which the leaves are subjected to the action of stripping mechanism while held by suitable gripping devices engaging the stem butts and in which the leaves are subjected to a preliminary leaf treatment whereby the stem butts are cleared of laminæ by a threshing operation to facilitate the seizure of the stems by the gripping devices, thereby insuring direct action by the gripping devices upon the stem butts and avoiding the slippage heretofore encountered when portions of the lamina of a leaf were gripped between the gripping devices and a stem butt. A further object is the production of a stemming machine in which bundles of leaves are fed to mechanism which operates to separate and space the stem butts and dispose them in a line or plane from which they are forwarded singly and successively to the stripping mechanism whereby leaves are more or less irregularly fed to the machine with their stem butts in superposed form or irregular formation and are without manual assistance rearranged in a single plane or other regular formation and then progressively acted upon by the stripping mechanism in large numbers. A further object is the production of a stemming machine in which a bundle of leaves is advanced while lying in a substantially horizontal position, which is the most convenient for feeding purposes the stem butts being separated and disposed in a line or plane during the advancing movement, and in which the leaves are delivered successively to a stripping mechanism spaced from the stem butt separating mechanism and turned in transit so that the leaves reach the stemming mechanism in substantially pendent position which is the most effective for stemming purposes. A further object is the production of a machine of the character just described provided with mechanism for interrupting the action of the stem butt separating mechanism so that leaves are delivered from the stem butt separating mechanism only at definite intervals, the purpose of this mechanism being to translate the movement of the leaves past the preliminary leaf treating mechanism at irregular intervals as the bundles of leaves are fed to the machine, into regular movement at definite intervals through the stripping mechanism determined by the spacing of the gripping devices. Another object is the production of a rotary stripping member having a spiral stem-way provided with transverse stripping edges, the purpose of this spiral stemway being to cause the active portion of the stripping member to advance the leaf in strict accordance with its advancement by the coöperating gripping members. Another object is the production of a rotary stripping member having a plurality of axial peripheral ribs and a diminishing spiral stem-way formed in the ribs the purpose of the diminishing spiral stemway being to more accurately fit the diminishing cross sections of the stem as it is drawn through said stemway during its advancing movement produced by the gripping members. Another object is the production of a stripping mechanism including a series of stemmer blades and means for moving said blades to cause them to collectively operate to sever the lamina and minor ribs of a leaf from its stem by a rapid succession of short stripping movements along the stem and for tilting said blades to reverse the relative movement of the leaf and each blade immediately after the stripping movement to prevent injury to the stripped leaf. Another object is the production of a stripping mechanism including a series of separated and successively acting blades and operating connections and a reciprocating knife coöperating with one of said blades to sever a stem at a point of predetermined stem diameter during the stripping operation whereby the unobjectionable smaller end of the stem may be left in the strip. With these and other objects not specifically mentioned in view, the invention consists in certain constructions, combinations, improvements and parts which will be hereinafter fully described and then specifically set forth in the claims hereunto appended.

In the accompanying drawings, which form a part of this specification and in which like characters of reference indicate the same or like parts, Figure 1 is a general elevation of a device constructed in accordance with the invention; Fig. 2 is a plan view illustrating a divided trough for separately receiving the completely stripped leaves and those which are only partially stripped and also the endless carrier for conveying the product out of the trough; Fig. 3 is a cross sectional view taken on the line 3—3 in Fig. 2; Fig. 4 is a cross sectional view taken on the line 4—4 in Fig. 2; Fig. 5 is a cross sectional view taken on the line 5—5 in Fig. 2; Fig. 6 is a detail view on an enlarged scale, in elevation and partly in section, of the means for separating the stem butts, means for forwarding the separated stem butts successively and delivering them to the carrier element from the separating mechanism turning them in transit; Fig. 7 is a plan view of the threshing mechanism for separating the lamina from the stem butts; Fig. 8 is a cross sectional detail view of the feed mechanism and the threshing mechanism showing also the means for holding the leaves on the feed mechanism while the threshing mechanism is in operation; Fig. 9 is a detail sectional view of a part of the feed mechanism; Fig. 10 is an enlarged cross sectional view in elevation of a portion of the carrier element of the stripping mechanism and the turning carrier which delivers leaves thereto, which are illustrated in Fig. 6; Fig. 11 is a detail view of one of the grippers of the carrier and means for opening and closing said grippers; Figs. 12 and 13 are respectively side and front elevations of the mechanism for separating the stem butts; Fig. 14 is a fragmentary view illustrating the delivery of stem butts singly from the separating mechanism to the turning carrier; Fig. 15 is a fragmentary detail plan view of the means for interrupting the action of the separating mechanism; Fig. 16 is a fragmentary sectional elevation of the driving means for the separating mechanism and the means for interrupting the action of the separator; Figs. 16ᵃ and 16ᵇ are detail views of a portion of the mechanism shown in Fig. 16; Fig. 17 is a plan view of the gearing for driving the separating mechanism; Figs. 18, 19, 20 and 21 are enlarged detail views of the stem clips mounted on the turning carrier; Figs. 22 and 23 are enlarged detail views of the secondary leaf carrier of the stripping mechanism; Fig. 24 illustrates the cam for turning the stem clips from the turning carrier; Fig. 25 is a longitudinal sectional view partly diagrammatic of one of the rotary stripping members; Fig. 26 is an end view of the rotary stripping members and a diagrammatic indication of the carrier grippers which coöperate therewith; Fig. 27 is a cross sectional view of one of the stripper blades taken on the line 27—27 in Fig. 25; Figs. 28, 29 and 30 are respectively cross sectional, side and edge views of the stem severing blades; Fig. 31 is a cross sectional view taken on the line 31—31 in Fig. 25, certain parts being omitted; Fig. 32 is a rear view of the machine illustrating the driving means for the various mechanisms; Fig. 33 is a plan view, partly broken away and partly illustrated diagrammatically, of the machine illustrated in Fig. 1; Fig. 34 is a detail view of a guide for stem butts coöperating with the feed mechanism; Fig. 35 is a rear end view of the machine largely broken away, part sectional and partly diagrammatic; Fig. 36 is a detail sectional view of the means for mounting and driving the brushes beneath the stemming devices.

In carrying the invention into effect there is provided a stripping mechanism including suitable gripping devices engaging the stem butts, and coöperating stripping members operating to separate the laminæ from the stems by a rapid succession of short stripping movements along the stem, the stripping members being withdrawn from contact with the leaf immediately after action thereon to avoid tearing of the lamina after it is separated from the stem. In the best constructions, there is also provided means for threshing the butt ends of the leaves to separate the laminæ from the stem butts for a limited distance in order to facilitate the action of the grippers. Means are also provided for supporting and advancing a bundle of tobacco leaves and separating the stem butts and disposing them in a line from which they are taken singly and delivered successively to the stripping mechanism. Means are also provided for advancing a bundle of leaves substantially in horizontal position, for threshing the butt ends of the leaves, for thereafter separating the stem butts and disposing them in a line and then forwarding them to the stripping mechanism and turning them in transit to a substantially pendent position, in which position they are acted upon by the stripping mechanism. Means are also provided for interrupting the action of the stem butt separating mechanism when leaves are closely bunched together and for delivering the leaves to the stripping mechanism at regular intervals. There is further provided means coöperating with the stripping mechanism for severing the stem only when a point of pre-determined diameter is reached, so that the unobjectionable extreme tip end of the stem may be left in the stripped lamina. All of the above means and mechanisms may be varied in construction within wide limits. The device selected to illustrate the invention is but one of many possible concrete embodiments of the invention and it is to be understood that the invention is not to be restricted to the precise details of the structure shown and described specifically. Moreover, certain parts of the invention are capable of use independent of other parts, and such independent use is contemplated.

When tobacco leaves are to be stored for future use, they are made up in what is known as "hands" or bundles, each bundle being usually tied by a single leaf wound around the stem butts of the other leaves of the bundle. They are then packed in hogsheads and held in storage for varying lengths of time. When such bundles of leaves are to be stemmed prior to manufacture, they are first "ordered" or softened in the original bundle form. When in the proper condition the binding leaf is then unwound from the stem butts of the other leaves of the bundle and the leaves are individually stemmed. The machine selected to illustrate the present invention is designed to support and advance "ordered" bundles of tobacco leaves after the binding leaf has been removed therefrom, to thresh the butt ends of the several leaves of the bundle to separate the laminæ from the stem butts for a limited distance in order to prepare them for the action of grippers designed to engage the stem butts and thereby forward the leaves, to dispose the threshed stem butts in a line and separate them and deliver them singly from such line, to take the separated stems singly from the separating mechanism and at regular intervals deliver them to a stripping mechanism which operates to separate the major portion of the laminæ from the stems by a rapid succession of short stripping movements and which operates further to sever the stem when a predetermined stem thickness is reached so that the unobjectionable part of the stem may remain in the stripped product. The device selected to illustrate the invention is further designed to feed the leaves initially in substantially horizontal position, which has been found the most convenient for this purpose, and to turn the leaves in transit from the feed mechanism to the stripping mechanism and to strip the leaves while they are in substantially pendent position, which has been found most effective for this purpose.

In the general view, Fig. 1, the reference character A designates generally the feed mechanism; B the threshing mechanism; C the stem butt separating mechanism; D the turning carrier which receives leaves from the separating mechanism and delivers them to the stripping mechanism turning the leaves in transit; and F the carrier element of the stripping mechanism.

The first operation performed upon the bundle of leaves by the present machine is that of threshing the butt ends of the leaves to separate the laminæ from the stem butts for a limited distance. While in certain constructions the leaf might be otherwise supported during this operation; as shown, the bundles of leaves are advanced in irregular formation into the range of action of the threshing mechanism by means of a belt 1 which runs over pulleys 2 (see Figs. 1 and 33). Located along one side of the belt 1 is a stem butt guide 3 having an upstanding whip rail 4. When a bundle of leaves is received by the operator of the machine, he strikes the butt ends of the leaves upon the whip rail 4, which action serves to loosen them. He then disposes them upon the belt 1 with their butt ends overhanging the belt and alined by the guide 3 in which position they are advanced in a direction at an angle to their stems. While the leaves might in certain constructions be otherwise held against displacement on the feed belt 1 during the threshing operation; as shown, there is provided means coöperating with the advancing means or feed belt for holding the leaves thereupon against displacement during a portion of the movement. This holding means includes a pressure belt 6 overrunning the belt 1 adjacent its inner edge and adapted to press upon the leaves against the belt 1 to prevent the threshing means from displacing the leaves or dragging them off of the belt. The belt 6 runs over a pair of pulleys 7 suitably supported by a bracket rising from the frame of the machine. To prevent the holding belt 6 from deflecting the upper run of the feed belt 1, thrust resisting devices 8 are arranged below the upper run of the belt 1 immediately under the position of the holding belt 6. These thrust resisting devices consist of a series of rollers 9 (see Figs. 6 and 8), mounted upon shafts 10 the axes of which are normally parallel to the surface of the upper run of the feed belt 1. Each of the shafts 10 is journaled in a yoke 11 slidably mounted in a bracket 12, which bracket is suitably supported upon the main frame of the machine. Each of the yokes 11 is attached to one end of a spring 13, and the other end of the spring is supported by the bracket 12 before referred to. The spring mounting of the rollers 9 and coöperating parts permits a limited yielding action of the rollers. Moreover, the outer surface 6ª of the belt 6 is formed of soft yielding material, such for instance as sponge rubber. It will therefore be readily understood that when the bundle of leaves is advanced by the feed belt and under the holding belt, the devices just described will automatically operate to grip the stems with substantially equal pressure when said stems vary in diameter. It may sometimes happen that two or more stems of a bundle passing under the holding belt 6 may be superposed and it will be further understood that when this occurs the yielding action of the parts just described will permit the advancement of the stems without danger of crushing them.

The threshing mechanism 5 (see Figs. 7 and 8) includes a casing open at the top and bottom and suitably supported from the main frame of the machine. A stem-way is formed in the side walls of the casing, as is clearly shown in Fig. 8, and through this stem-way the stem butts which overhang the adjacent edge of the feed belt 1 are passed by the feed belt 1 and the coöperating holding belt 6. The threshing mechanism includes two coöperating series of flails 14, each flail being movable in an orbital path between and along the stem butts. The flails of each series are pivoted to a rotary member 15 common to all of the flails of the series and this member is journaled in suitable bearings formed in the casing before referred to. Each of the coöperating rotary members 15 is driven at high speed and the high speed of the members operates to cause the flails 14 to be projected substantially radially by the centrifugal force developed by the rotating members. By an inspection of Fig. 8 it will be readily seen that the two series of flails are superposed, one being mounted above the stem-way formed in the casing and one below it. The flails, acting upon a bundle of stem butts as the feed belt advances the leaves, operate to straighten and thresh the laminæ from said stem butts for a short distance from the extreme butt end of the leaf. The laminæ threshed from the stem butts falls through the open bottom of the casing and into a chute 16 (see Fig. 2). While in certain constructions the flails, when flails are used, may be otherwise operated; as shown, each of the rotary members 15 is driven by means of a belt 96 which derives its motion from a pulley 97 fixed upon one end of a countershaft 95 which shaft is journaled in bearings formed in the ends of brackets extended from the rear side of the frame of the machine. The countershaft 95 is further provided with a sprocket 94. A chain 93 drives the sprocket 94 and this chain derives its motion from a sprocket 92 fixed upon a shaft marked S which extends along the rear side of the machine and which is the main power shaft of the machine. This shaft derives its motion from a belt 91ª which runs over fast and loose pulleys of well-known construction and indicated at 91. Belt shifting mechanism of ordinary construction is provided and includes an operating handle 125, a connecting link 126 and a lever 127 having means engaging the belt for shifting it from the fast to the loose pulley and vice versa.

After the butt ends of the leaves have been threshed and the stem butts straightened and cleaned of laminæ, the feed mechanism advances the leaves into the range of action of a separating or spacing device which operates to separate the stem butts so that they may be by suitable mechanism engaged and advanced singly through the machine. The stem butt separating mechanism includes two coöperating series of forwarding members separated and arranged to form a stem-way for leaves advanced by the feed belt and coöperating pressure belt and means for driving the members of each series at progressively increasing speeds. While in certain constructions the forwarding members may be of different form; as shown, each series of forwarding members is made up of a plurality of rolls 17, the axes of the rolls of the two series being staggered. This staggered position of the rolls causes them to form a tortuous stem-way 19, clearly indicated in Fig. 13. It will be seen by an inspection of Fig. 13 that the frame supporting the rolls 17 is so arranged with respect to the feed belt 1 and the pressure belt 6, both of which belts are indicated in said figure by broken lines, that the separating rolls begin to act upon the stem butts while the leaves are held between the feed belt 1 and the pressure belt 6. It will be noted also that the upper surface of the feed belt 1 lies just below the mean plane of the tortuous stem-way 19 and that these stems are carried alternately above and below this mean plane when passing from roll to roll. This action tends to loosen the leaves which may be matted together, and facilitate the stem butt separating operation. The rolls may be provided with peripheral operating surfaces of a yielding material, such for instance as rubber, in order to prevent crushing and slipping of the stem butts therebetween. The rolls are driven at progressively increasing speeds so that the stem butts are separated as they pass through the stem-way. While, in certain constructions, other means may be employed for driving the rolls; as shown, they derive their motion from a master bevel gear 21 fast on a master shaft 22 suitably journaled in the frame carrying the rolls. The bevel gear 21 is in mesh with and derives its motion from a bevel pinion 99 which is fast upon a short shaft also carrying a pulley over which a belt 98 runs. This belt 98 also runs over a pulley fast upon the countershaft 95 before referred to. Referring particularly to Figs. 16 and 17, it will be seen that the master gear shaft 22 carries two gears $a$ and $c$. From $c$ motion is communicated to the rolls toward the entrance of the stem-way 19 by a series of motion reducing gears as follows: gear $c$ is in mesh with gear $d$ on the shaft 20ª (see Fig. 16) whereby said shaft is driven. On shaft 20ª, in rear of gear $d$, is arranged a gear $e$ in mesh with gear $f$ on shaft 20ᵇ, thus driving this shaft. On shaft 20ᵇ in front of gear $f$ is arranged gear $g$ which meshes with gear $h$ on shaft $20^c$, driving said shaft. At the rear end of shaft $20^c$ is gear $i$ which meshes with gear $j$ on shaft $20^d$ on which is also arranged a gear $k$ which meshes with the gear $l$ on shaft $20^e$, driving said shaft. On shaft $20^e$ is also arranged gear $m$ which meshes with gear $n$ on shaft $20^f$, driving the latter. Going now to those shafts toward the delivery end of the stem-way 19, the gear $a$ on master gear shaft 22 meshes with gear $o$ on shaft $20^g$, driving said shaft. The shaft $20^g$ carries gear $p$ at its rear end, and gear $p$ is in mesh with gear $q$ on shaft $20^h$ by which said shaft is driven. Upon the shaft $20^h$ is also arranged gear $r$ which meshes with gear $s$ on shaft $20^i$ driving the latter.

It will be readily understood that by the mechanism just described the stem butts are arranged substantially in a line or plane and separated or spaced so that they can be removed from the separator one by one. Up to this point the mechanisms operate to advance leaves as they happen to be placed upon the feed belt; that is to say, at irregular intervals. The leaves are to be forwarded from the separating mechanism to the stripping mechanism and there operated upon at regular intervals. Means are therefore provided for interrupting the operation of the separating mechanism at irregular intervals, and releasing the same for further operation at regular intervals whenever the stem butts are lying in the separator stem-way, and such means is controlled by a stem in the stem-way. As shown, there is provided a movable member 23 (see Figs. 12, 13 and 14), which member is fixed to a rock shaft 24 journaled in suitable bearings formed in the casing of the separating mechanism. The free end of this movable member projects into the delivery end of the stem-way and is adapted to be moved by a stem passing through said stem-way at this point. When such a movable member is used, operating connections including a pawl and ratchet mechanism is employed for the purpose of interrupting the operation of the separating mechanism when a stem reaches the delivery end of the stem-way and operates the movable member. As shown, the rock shaft 24 is provided with an arm 25 (see Fig. 16) having a forked end, and in this forked end is fitted the free end of an arm 26, the other end of which is journaled upon the shaft $20^a$ before referred to. The arm 26 carries a pawl 27 adapted to engage a ratchet 28 carried by an adjacent member of the series of separator roll shafts. It will be readily understood that when a stem passing through the stem-way reaches the delivery end thereof and operates the movable member 23, the shaft 24 will be rocked and said shaft in turn will rock the arm 25 in engagement with the arm 26. The arm 26 will therefore be rocked and cause the pawl 27 to engage the ratchet 28, thereby interrupting the operation of the separator rolls. It will of course be understood that when the separator rolls are stopped, the driving belt 98 will slip on its pulleys. The separator rolls remain stationary until the leading stem butt which operates the movable member is removed from the separating mechanism.

While in certain constructions other means might be employed for the purpose of releasing the movable member to permit the separator rolls to again operate; as shown, there is provided a spring 29 interposed between the movable member and a fixed block $29^a$ in which the rock shaft 24 moves. When the movable member is operated by a stem to interrupt the operation of the separator as above described, the spring 29 is compressed, and when the stem is removed from engagement with the movable member, the spring 29 operates to again project the movable member into the delivery end of the stem-way where it may again be operated by a stem moving through said stem-way. It will be readily understood that this action also rocks the shaft 24 in a reverse direction and through the agency of the arms 25 and 26 disengages the pawl from the ratchet. There is further provided a spring $41^a$, one end of which is connected to a fixed part of the separator casing and the other end of which is connected to the free end of an arm 41 which is riveted or otherwise secured to the arm 26 before described. It will be readily understood that when the arm 26 is swung to cause the pawl to engage the ratchet, the spring $41^a$ will be placed under tension and that when the stem is removed from engagement with the movable member, the spring $41^a$ will assist the spring 29 in returning the various parts of this pawl and ratchet mechanism to their normal positions. Means are provided for releasing a stem butt from engagement with the movable member 23 but since this mechanism operates in timed relation with the means for forwarding leaves singly from the separator mechanism, it will be described in connection with said forwarding means.

It will be noted that in the machine selected to illustrate the invention, the mechanism so far described operates to advance a bundle of leaves, to thresh the butt ends of said leaves and to separate the stem butts of said leaves while they are lying in substantially horizontal position. While in certain constructions other means may be employed for removing the leaves singly from the feed mechanism and stem butt separating mechanism and delivering them successively to a stripping mechanism; in the present machine, the stem butts are engaged while lying in horizontal position and singly forwarded to a stripping mechanism and turned in transit from the position in which they were received to a substantially vertical position, in which pendent position they are delivered to the stripping mechanism. This means for forwarding leaves and turning them in transit may be termed a turning carrier and when such carrier is used it will be provided with forwarding means and a series of leaf holders mounted in the forwarding means and coöperating means for turning the holders in the forwarding means during the forwarding operation. As shown, the turning carrier includes a rotating turret 30 (see Figs. 6 and 10) mounted on and rotated by a shaft journaled in a bracket rising from the main frame of the machine. This shaft carries a bevel gear 108 in mesh with a bevel pinion 106, which pinion is fast upon a vertical shaft 102 journaled in an extension of the bracket supporting the turret shaft and also in a bearing 103 formed in a bracket bolted to the main frame of the machine. The shaft 102 carries a worm wheel 104 which is operated by a worm 105, the worm being fast upon the main power shaft S of the machine. The turret is provided with a series of stem clips 31 arranged around and pivotally mounted at the periphery of said turret. Each of these stem clips includes a rocking casting 32 to which is secured a fixed jaw 31$^a$ and a movable jaw 31$^b$. It may be here remarked that during the operation of the rotating turret it is necessary to hold the jaws in closed position during a part of the movement of said turret and to hold them in open position during another part of the movement of said turret. With this object in view, each of the holders is provided with toggle mechanism adapted to effect the desired purpose. This toggle mechanism includes a spring plunger 33 housed in a cylindrical section of the casting 32 and bearing against a toggle arm 35 which is pivoted to the tail of the movable jaw 31$^b$. By an inspection of Figs. 19 and 20, it will be readily understood that this toggle mechanism operates in a well-known manner to hold the jaws either in open or closed position dependent on the passage of the toggle pivot over the axial line of the plunger which intersects the pivotal axis of the movable jaw 31$^b$. For the purpose of throwing this toggle mechanism over center from or to open position, the tail of the jaw 31$^b$ is provided with a stud 36 the base of which engages the forked end of a toggle break lever 44. As any one of the stem clips passes the delivery end of the separator mechanism where a stem lies ready for removal, the stud 36 is operated by means in its path to close the jaw after it has engaged a stem butt lying at the delivery end of the separator mechanism. This jaw closure includes a bell-crank lever 37 one arm of which carries an adjustable bowl running on the periphery of a cam 38 fast upon the main power shaft S before referred to. The bowl is held to its work in coöperation with the cam 38 by means of a spring 39, one end of which is fast to the bell-crank lever and the other to the casing of the separating mechanism. The other end of the bell-crank lever constitutes a trip which engages the projecting end of the stud 36 and is so positioned that after the jaws in their open position have encompassed the butt end of the stem, as shown in Fig. 14, the bell-crank lever is operated by the cam 38 to throw the jaw of the stem clip to closed position in which it is held by its spring pressed toggle mechanism, thus firmly grasping the stem butt. The operation of this part of the mechanism is clearly illustrated in Fig. 14, where one clip is just about to engage and remove a stem, while the preceding clip has closed upon and carried away the preceding stem. The bell-crank lever 37 carries an adjustable angular arm which, when the bell-crank lever is moved in a reverse direction, engages the arm 41 before described and throws the pawl and ratchet mechanism out of action so that the stem butt separator mechanism may resume its operation. While in certain constructions, other means may be employed for turning the stem clips in the rotating turret to shift the position of the leaves forwarded thereby from horizontal to vertical; as shown, there is provided a stationary cam 42 for this purpose. This stationary cam is provided with a cam groove changing from peripheral to side-faced, as clearly shown in Figs. 11 and 24. This cam is bolted to the bracket supporting the turret shaft and it supports, at a point on its periphery over its axis, an abutment 43 lying in the path of movement of the toggle break levers 44 before referred to. When any particular stem clip reaches this point, the lever 44 comes into engagement with the abutment 43 and the jaws of the clip are thereby thrown into open position. It will be understood that this action takes place only at the point where the leaf is to be delivered to the carrier element of the stripping mechanism. The turning action of the cam 42 in coöperation with the stem clips will be readily understood by an inspection of Fig. 10 and without further description.

From the turning carrier the leaves are delivered singly and successively to the stripping mechanism which operates to remove the major portion of the laminæ from the stems. While in certain constructions other means for retaining the stem in the stem-way may be employed; in the device selected to illustrate the invention, this stripping mechanism includes means for supporting the stems during the stripping operation and further includes a pair of rotary members each having a plurality of axial peripheral ribs and a spiral stem-way formed in but shallower than said ribs, said members being positioned to cause the ribs to intermesh and the spiral stem-ways to register to form a stem retaining stem-way which extends throughout the length of the members and is never completely closed. It is to be understood that the term "axial peripheral ribs" means ribs mounted on the peripheries of the rotary members and having a movement about or relative to the axis of said members. The stem-way of each rotary member is further provided with transverse stripping edges and one end of each member is conical in form, its conical end having a spiral groove adapted for guiding a stem into the main stem-way. The ribs of the rotary members are in the form of blades and means are provided for moving the blades to cause them to collectively operate to separate the major portion of the lamina and the minor ribs of a leaf from its stem by a rapid succession of short stripping movements along the stem, and for producing a reverse relative movement of the leaf and each blade immediately after its stripping movement to prevent injury to that portion of the lamina previously separated from the stem. The means for supporting the leaf during the stemming operation includes a carrier adapted to engage the butt ends of the stems of the leaves and means for producing a relative angular movement of the rotary members and the carrier whereby the lamina and stem are separated by the stripping edges. As shown, each of the rotary stripping members is substantially cylindrical in formation and rotatable upon a substantially horizontal axis. Each of said members includes a support for a series of stemmer blades 45 (see Figs. 25 and 26), the blades being symmetrically arranged and pivotally supported at the periphery of the supports. Each blade is provided with a series of recesses or stem pockets 48 gradually and regularly diminishing in size from one end of the blade to the other. The pockets 48 of the several blades mounted in each support are so arranged with respect to each other that they collectively form a spiral stem-way extending from one end of the support to the other. The flat side of each blade adjacent the stem pockets 48 forms the stripping edge of the blade which is of course transverse to the rim of the stripping member formed by the blade. For the purpose of guiding a stem into the stem-way, one end of each member is conically formed at 49 and in this conical portion of the support a spiral groove 49$^a$ is cut. The pitch of this groove is the same as the pitch of the spiral stem-way and where, as in the present machine, two such coöperating rotary members are employed, the stem of a leaf forwarded by the carrier element of the stripping mechanism is engaged by the coöperating spiral grooves 49$^a$ and positively guided into the spiral stem-way formed by the stem pockets 48 of the two rotary members. The supports are keyed upon shafts 50 journaled in suitable bearings 85 (see Fig. 33) supported by the frame of the machine. These shafts are driven by a train of gears marked 116 and located at the left end of the machine (see Fig. 1) and driven by a spur gear 115 fast upon the main power shaft S before referred to. The blades 45 are screwed or otherwise fastened to blade holders 51 (see Fig. 25) and each of these blade holders is clamped by means of screws, as clearly shown in Fig. 25, to crank arms 66 journaled in the support and by means of which the blade is moved or swung in position at the periphery of the support. The crank arms 66 carry bowls running in cam grooves 67 of stationary cams 68 surrounding the shaft 50. The cam groove 67 is shaped (see Fig. 26) to cause the blades to be projected substantially radially of the support to cause them to collectively operate to sever the lamina and minor ribs of a leaf from its stem by a rapid succession of short stripping movements along the stem and for producing a reverse relative movement of the leaf and each blade immediately after its stripping movement. In other words, the blades are projected radially and act upon the leaf while in this position. Immediately after they have stripped a very short section of the lamina from the leaf, they are swung backward out of contact with the leaf by the co-action of the crank arm 66 and cam groove 67. This eliminates danger of injuring the stripped lamina after it has been separated from the stem and while the blade is passing through its orbit, after having performed its function, to again bring it into position for another operation.

It sometimes happens that as the leaves are fed to the stripping mechanism their tip ends are more or less entangled because the stem forwarding devices are too close together to fully separate the entire leaves. For the purpose of disentangling the leaves in the stripping mechanism when this occurs. there are provided rotating brushes 78, (see Figs. 1 and 36) located below and extending substantially throughout the length of the rotary stripping members. These brushes derive their motion from intermeshing gears 118, one of which is fast upon the shaft upon which the brush is mounted; the other being fast upon a short shaft journaled in a sleeve 117ª, which sleeve is held in position in a suitable bearing in the main frame of the machine by means of a set screw 117ᵇ. The extreme rear end of the shaft carrying the gear 118 is provided with an enlarged head pinned to the hub of one of the gears 116 before referred to. The shafts of the brushes are journaled in arms 117 which are clamped to the sleeve 117ª and adjustable thereupon so that they may be swung toward each other to bring the brushes in close relation to each other.

The extreme tip end of the stem is no larger than the minor ribs of the leaf and when the leaves are not exceptionally large, the presence of the extreme end of the stem in the stripped product is unobjectionable. Means are provided, therefore, for severing the stem at a point of pre-determined thickness only. It may be here remarked that the leaves of a bundle or "hand" of tobacco are not all of the same length and since the tobacco is fed to the machine without sorting the leaves to group those of the same length, it necessarily follows that a short leaf may be forwarded through the stripping mechanism between two long leaves. When this occurs the machine is designed to sever the stem when the point of pre-determined thickness is reached, irrespective of the length of the leaf. In the device selected to illustrate the invention, a reciprocating knife which coöperates with one of the blades of the stripping members is employed for this purpose. As shown (see Figs. 25, and 28 to 31), one of the blade holders 51 is provided with a recess in which is mounted a reciprocating knife 47 which is provided at its outer edge with a series of recesses 71, the walls of which form shearing edges. The blade 45 with which this knife coöperates is provided with similar notches adapted to coöperate with the notches of the knife 47 to shear a stem lying in said notches when they are in register. These notches progressively diminish in size from one end of the knife to the other. It is, however, to be understood that the knife does not extend throughout the length of the blade 45, and that portion of the blade which does not coöperate with the knife 47 is provided with the usual stem pockets 48. The knife 47 is bolted or otherwise secured to a collar 73 slidable upon the left end of the cylindrical portion 65 of the crank arm 66 which operates the blade 45 coöperating with the knife. The collar 37 is engaged by one arm of a forked bell-crank lever 72. This bell-crank lever is fulcrumed upon a suitable pivot mounted in a support for the blades and the other arm of the lever engages a groove 74 formed in a stationary cam 75 abutting the cam 68 at the left end of the stripping member. The cam groove 74 is shaped to produce a shearing relative movement of the knife 47 and coöperating blade 45 only at the moment said blade is in engagement with the stem. It will be readily understood that as the stem is advanced along the stripping member and the stripping member is rotated, the stem will be carried on past the notches 71 unless it is of the proper thickness to enter one of said notches. When this occurs and the knife is operated, the stem will be severed.

The rotary stripping members described are mounted in slides 87 (see Fig. 35) supported by the main frame of the machine. Means are provided for adjusting these slides toward and away from each other to produce a relative approaching or receding movement of the stripping members for the purpose of adjusting the said members to operate upon different grades of tobacco leaves and to compensate for any inaccuracy of adjustment of the bearings in which the stripping members rotate. The slides are frictionally held in position by means of friction devices 87ª operating in suitable shouldered slots in the slides. The slides are connected and moved by links 88 (see Fig. 33). These links are also connected to the T-head of a vertical shaft 89 mounted in suitable bearings in the main frame. The lower end of the shaft 89 carries a worm wheel which is in mesh with a worm formed on a shaft extending to the front of the machine. This shaft is rotated by means of the hand wheel 90 (see Fig. 35). It will be readily understood that rotation of the hand wheel 90 results in the rotation of the shaft 89, and through the agency of the links 88 these ends of the stripping members are moved toward and away from each other. At the other end the slides 87 are adjusted by means of screws 86.

While other means moving at an angle to the axis of the stripping members may be used in certain constructions for forwarding the leaf to be stemmed along the stripping members, the present machine includes two carriers for a leaf to be stemmed arranged in tandem within the range of action of the stripping members, the one delivering the leaf automatically to the other. Both of these carriers are in the form of chains carrying devices for gripping the stem butt. The turning carrier delivers the leaves automatically to what may be termed a primary forwarding chain provided with stem grippers for holding and forwarding the leaves. This primary forwarding chain automatically delivers the leaves to what may be termed a secondary forwarding chain, the operating run of which overlaps the operating run of the gripper chain, said secondary forwarding chain being provided with clips arranged to automatically seize a leaf stem just before it is released from one of the chain grippers and operates to carry the leaf so seized to a point beyond the range of action of the gripper chain and to a point beyond the range of action of the stripping members. The carrier for the leaves to be stripped by the stripping members is generally indicated by the reference character 46. The primary forwarding chain, however, is marked 54 and this chain runs over sprockets 54ᵃ. Mounted in the primary chain is a series of stem butt grippers 53 each adapted to seize the stem butt of a single leaf and forward it into the range of action of the rotary stripping members along said stripping members for a limited distance and into the range of action of the secondary forwarding chain. Each gripper 53 consists of jaws pivotally mounted upon a fulcrumed bar 56 forming a part of the chain generally indicated by the reference character 54. The jaws are normally held in closed position by the action of a bent wire spring 57. Means are provided for positively opening said grippers at separated points; first at the point where the grippers engage a stem butt to receive it from one of the holders of the turning carrier after the latter has operated to turn the leaf from its original horizontal position to a pendent position. This action is illustrated in Fig. 10 where one of the forwarding chain grippers has just closed upon the stem butt while the turning carrier holder is in position to be operated to release the leaf. The other point at which means are provided for opening the stem grippers is at the other end of the operating run of the primary forwarding chain 54; that is, where it runs over the other sprocket 54ᵃ. As shown, the lower sprocket 54ᵃ carries a series of reciprocatory plungers 60 and these plungers are so located in the sprocket as to be operable upon the tail end of the grippers at the time it is desired to open and close the same. The plungers are carried around by the sprockets and track on stationary cams 59 mounted in their path. These cams are formed to move the plungers inwardly, to gradually open the grippers as they pass over the lower sprocket, and to suddenly release the grippers successively as they successively come into position to seize a stem butt in the turning carrier. The means for effecting the desired result is clearly shown in Fig. 10. At the end of the operating run of the primary forwarding chain the grippers are opened in a different manner. As shown (see Fig. 11), the upper sprocket is provided with oppositely disposed cam surfaces 61 which contact with the tail ends of the grippers as they successively pass over the sprockets. It will be readily seen that after any particular gripper has passed over the upper sprocket and its tails have left the surfaces 61, the gripper will be closed by the action of its spring and will remain closed until it is again opened by the plungers of the lower sprocket. The upper sprocket is idle and journaled upon a stationary shaft 58ᵃ supported in bearings adjustably mounted upon and forming a part of the frame of the machine and extending in a direction at an angle to the axis of the rotary stripping members. The lower sprocket 54ᵃ is fixed upon a shaft mounted in suitable bearings rising from the main frame of the machine and this shaft carries a bevel gear 107ᵃ which is in mesh with a bevel gear 107, the latter being fast upon the shaft 102 before referred to. From this shaft the primary forwarding chain derives its motion. It will be readily understood by an inspection of Figs. 1 and 10 that the sprockets 54ᵃ rotate in vertical planes and that the chain forms a leaf carrier above the stem-way formed in the rotary stripping members. As before stated, the primary forwarding chain delivers the leaves to a secondary forwarding chain which is marked 55. This chain runs over sprockets 63 rotatable in planes lying at an angle to the planes in which the primary chain sprockets rotate. The upper sprocket 63 is fast upon the end of a short shaft which is journaled in suitable bearings carried by brackets rising from the left end of the machine (see Figs. 33 and 35). This short shaft carries a spiral gear 112 which is in mesh with a second spiral gear 111. The spiral gear 111 is fast upon a shaft 110 extending downwardly alongside the primary forwarding chain. Upon its lower end the shaft 110 carries a bevel gear 109, and this bevel gear is in mesh with the bevel gear 107ᵃ before described and from which it derives its motion. Each link of the secondary forwarding chain 55 is provided with a stem clip 62 (see Figs. 22 and 23). These stem clips are made of spring metal screwed to the inner side of the links and bent to pass between the link to which it is secured and thence along the adjacent link where it coacts with a rubber cushion 64 countersunk in said adjacent link. By an inspection of Fig. 22 it will be readily understood that as the secondary chain passes around its lower sprocket 63, the clips are opened and by an inspection of Fig. 1 it will be noted that this opening action takes place while stems are being advanced by the primary forwarding chain. In Fig. 2 the stems are indicated on their line of travel at this time and it will be readily understood that as the clips of the secondary chain pass around the lower sprocket they move automatically into position to seize a stem being advanced by the primary forwarding chain. It will be remembered that the grippers of the primary forwarding chain release the stems as they successively pass over the upper sprocket of the primary forwarding chain. Before this occurs, however, the secondary chain clips seize the stems, and it will be further understood that the secondary forwarding chain carries the stems to a point beyond the range of action of the primary forwarding chain and to a point where the rotary stripping members cease to act upon the leaf.

The short shaft upon which the upper sprocket 63 is fast carries a spur gear 114 which gear is in mesh with a pinion fast upon a shaft carrying at its other end a rotating brush 77 which engages the secondary forwarding chain 55 and operates to brush the stems therefrom as the clips open while the chain passes around the upper sprocket. When the stem is thus released it drops into a chute 76 (see Fig. 1), from which it passes to any suitable receptacle not shown.

It sometimes happens that a portion of the leaves in a "hand" or bundle operated upon by the machines have broken stems and in this event it will, of course, follow that when the lamina is stripped from the butt end of the leaf above the break in the stem, the remainder of the stem will fall below the stem-way with the stripped leaf. To keep such broken leaves separated from the properly stripped product in the device selected to illustrate the invention, there is arranged below the rotary stripping members a trough 79, Figs. 1 to 5 inclusive. This trough is inclined from the horizontal and its delivery end is in close proximity to a table or other receptacle indicated at 80. The trough is divided in two general parts marked 79ᵃ and 79ᵇ, the part 79ᵃ being located adjacent the table 80. This part 79ᵃ is adapted to receive the laminæ of properly stemmed leaves, while the part 79ᵇ is so located that the imperfectly stemmed leaves fall thereinto. In the part 79ᵇ is located a deflecting plate 81 which is adapted to guide leaves falling thereupon to one side of the trough. In the part 79ᵃ there is located a deflecting plate 82 which is adapted to guide stripped product falling thereupon to the opposite side of the trough. It may sometimes happen that an unusually short leaf may be perfectly stemmed and yet fall into the middle of the trough where adjacent ends of the guide plates 81 and 82 meet. To prevent such leaf from being guided into that portion of the trough reserved for imperfectly stemmed leaves, there is located just over the trough at this point a rotary brush 83 which is adapted to throw any stem or leaf falling thereupon into the proper division of the trough. The bottom of the trough is formed by a traveling belt 84 running over a pulley 120 at the delivery end of the chute and over another pulley (see Fig. 22), which is mounted upon a shaft journaled in the main frame of the machine. This shaft carries a sprocket which is driven by means of a chain 119ᵃ, this chain deriving its motion from a second sprocket fast on a short shaft which carries a pulley driven by a belt 119, which in turn derives motion from the countershaft 95 before referred to. The brush 83 is driven by a belt indicated in full lines in Fig. 35 and by dotted lines in Fig. 31. This belt derives its motion from the pulley 112 before referred to.

In view of the foregoing, a detailed description of the operation of the device is deemed unnecessary, and is therefore omitted in the interest of brevity.

What is claimed is:

1. In a tobacco stemming machine, the combination with means for supporting a leaf, of a series of flails, and means for moving the flails in an orbital path and along the leaf stem for threshing the butt of the leaf to separate its lamina from its stem.

2. In a tobacco stemming machine, the combination with means for supporting a leaf, of a member rotating at high speed, and a series of flails mounted in the member and projected substantially radially therefrom by centrifugal force for threshing the butt of the leaf longitudinally thereof to separate its lamina from its stem.

3. In a tobacco stemming machine, the combination with means for supporting a leaf, of a pair of members located one on either side of the leaf butt, means for rotating said members at high speed in opposite directions, and a series of flails mounted in each member and projected substantially radially therefrom by centrifugal force for threshing the butt of the leaf longitudinally thereof to separate its lamina from its stem.

4. In a tobacco stemming machine, the combination with two coöperating series of forwarding members separated and arranged to form a stem-way for leaves moving in a direction at an angle to their stems, and means for driving the members of each series at progressively increasing speeds.

5. In a tobacco stemming machine, the combination with two superposed series of forwarding members separated and arranged to form a stem-way for leaves moving in a direction at an angle to their stems, and means for driving the members of each series at progressively increasing speeds.

6. In a tobacco stemming machine, the combination with two coöperating series of forwarding members separated and arranged to form a tortuous stem-way for leaves moving in a direction at an angle to their stems, and means for driving the members of each series at progressively increasing speeds.

7. In a tobacco stemming machine, the combination with two coöperating series of forwarding rolls separated and arranged to form a stem-way for leaves moving in a direction at an angle to their stems, and means for driving the members of each series at progressively increasing speeds.

8. In a tobacco stemming machine, the combination with two superposed series of forwarding rolls separated and arranged to form a tortuous stem-way for leaves moving in a direction at an angle to their stems, and means for driving the members of each series at propressively increasing speeds.

9. In a tobacco stemming machine, the combination with two coöperating series of forwarding members separated and arranged to form a stem-way, means for driving the members of each series at progressively increasing speeds, and means for intermittently stopping the driving means.

10. In a tobacco stemming machine, the combination with two coöperating series of forwarding members separated and arranged to form a stem-way, means for driving the members of each series at progressively increasing speeds, and means controlled by a stem in the stem-way for intermittently stopping the driving means.

11. In a tobacco stemming machine, the combination with two coöperating series of forwarding members separated and arranged to form a stem-way, means for driving the members of each series at progressively increasing speeds, a movable member projecting into the delivery end of the stem-way and adapted to be moved by a stem passing through said stem-way, and connections whereby said member when moved stops the driving means.

12. In a tobacco stemming machine, the combination with two coöperating series of forwarding members separated and arranged to form a stem-way, means for driving the members of each series at progressively increasing speeds, an oscillatory member projecting into the delivery end of the stem-way and adapted to be moved by a stem passing through said stem-way, and a pawl and ratchet mechanism connected with and operated by the oscillatory member for stopping the driving means when the oscillatory member is moved by a stem.

13. In a tobacco stemming machine, the combination with rotary forwarding means, of a leaf holder mounted in the forwarding means, and means for turning the holder in the forwarding means to turn the leaf from a horizontal position to a vertical position.

14. In a tobacco stemming machine, the combination with rotary forwarding means, of a stem-clip mounted in the forwarding means, and means for turning the stem-clip in the forwarding means to turn the leaf from a horizontal position to a vertical position.

15. In a tobacco stemming machine, the combination with rotary forwarding means, of a leaf holder mounted in the forwarding means, and coöperating stationary means for turning the holder in the forwarding means to turn the leaf from a horizontal position to a vertical position.

16. In a tobacco stemming machine, the combination with rotary forwarding means, of a leaf holder mounted in the forwarding means, and a coöperating stationary cam engaging the leaf holder and shaped to turn said leaf holder in the forwarding means during the forwarding action to turn the leaf from a horizontal position to a vertical position.

17. In a tobacco stemming machine, the combination with rotary forwarding means, of a leaf holder mounted in the forwarding means, and a stationary cam having a groove changing from peripheral to side-faced and engaging the leaf holder for turning the latter in the forwarding means during the forwarding action.

18. In a tobacco stemming machine, the combination with a rotating turret, of a series of stem-clips arranged around and pivotally mounted at the periphery of said turret, and a stationary substantially circular cam having a cam groove changing from peripheral to side-faced and engaging the stem-clips to turn them during the forwarding action.

19. In a tobacco stemming machine, the combination with a rotating turret, of a series of stem-clips each comprising a pair of jaws and spring pressed toggle mechanism for holding said jaws either in open or in closed position and collectively arranged around and pivotally mounted at the periphery of said turret, a stationary substantially circular cam having a cam groove changing from peripheral to side-faced and engaging the stem-clips to turn them during the forwarding action, and means for opening and closing the stem-clips against the action of their spring pressed toggles.

20. In a tobacco stemming machine, the combination with means for feeding the leaves, of means engaging and acting on the stem butts for separating the latter and passing them singly to a stemming machine.

21. In a tobacco stemming machine, a rotary member having a plurality of axial peripheral ribs and a spiral stem-way formed in the ribs.

22. In a tobacco stemming machine, a rotary member having a plurality of axial peripheral ribs and a spiral stem-way formed in and shallower than the ribs and extending throughout their length.

23. In a tobacco stemming machine, a pair of rotary members each having a plurality of axial peripheral ribs and a spiral stem-way formed in said ribs, said members being positioned to cause the ribs to intermesh and the spiral stem-ways to register to form a stem retaining stem-way.

24. In a tobacco stemming machine, a pair of rotary members each having a plurality of axial peripheral ribs and a spiral stem-way formed in said ribs said members being positioned to cause the ribs to intermesh and the spiral stem-ways to register to form a stem retaining stem-way which is never completely closed.

25. In a tobacco stemming machine, a rotary member of longitudinally arranged blades having notches provided with transverse stripping edges arranged in a spiral stem-way.

26. In a tobacco stemming machine, a rotary member of longitudinally arranged blades having progressively diminishing notches provided with transverse stripping edges arranged in a progressively diminishing stem-way.

27. In a tobacco stemming machine, rotary members of longitudinally arranged blades having notches arranged in a spiral stem-way one of said members being provided with a conical end having a spiral groove for guiding a stem into the stem-way.

28. In a tobacco stemming machine, rotary members of longitudinally arranged blades having notches provided with transverse stripping edges arranged in a spiral stem-way one of said members being provided with a conical end having a spiral groove for guiding a stem into the stem-way.

29. In a tobacco stemming machine, a pair of oppositely rotating members of longitudinally arranged blades having notches provided with transverse stripping edges arranged in a spiral stem-way and being substantially cylindrical in formation but being conical at one end, the conical end of both members being provided with coöperating spiral grooves for guiding a stem to a closed channel formed between the cylindrical parts of the members.

30. In a tobacco stemming machine, a pair of oppositely rotating members of longitudinally arranged blades having notches provided with transverse stripping edges arranged in a spiral stem-way and being substantially cylindrical in formation but being conical at one end, the conical ends of both members being provided with coöperating spiral grooves for guiding a stem to a closed channel formed between the cylindrical parts of the members said members being further provided with transverse stripping edges.

31. In a tobacco stemming machine, a rotary member formed with substantially radial peripheral ribs having a spiral stem-way cut therein, the member also having a conical end provided with a spiral groove for guiding a stem to the stem-way.

32. In a tobacco stemming machine, the combination with a leaf carrier having means for gripping a stem, of a pair of rotary stripping members inclined relative to the carrier and constructed of longitudinally arranged blades having notches provided with transverse striping edges arranged in a spiral stem-way, and means forming a continuously operating guide to said stem-way adjacent said carrier whereby at all times the stems presented by the carrier are introduced into the stem-way without danger of being cut.

33. In a tobacco stemming machine, the combination with means for supporting a leaf to be stemmed, of a series of stemmer blades, and means for moving said blades to cause them to collectively operate to sever the web and minor ribs of a leaf from its stem by a rapid succession of short stripping movements along the stem and for tilting the blades to produce a reverse relative movement of the leaf and each blade immediately after its stripping movement to prevent injury to the stripped lamina of the leaf.

34. In a tobacco stemming machine, the combination with means for supporting a leaf to be stemmed, of a support, means for moving the support, a series of stemmer blades mounted in the support, and means for moving said blades in said support to project them substantially radially of the support to cause them to collectively operate to sever the lamina and minor ribs of a leaf from its stem by a rapid succession of short stripping movements along the stem and for tilting said blades for reversing the movement of each blade to withdraw it from contact with the leaf immediately after action thereon.

35. In a tobacco stemming machine, the combination with means for supporting a leaf to be stemmed, of a substantially cylindrical support, means for rotating the support, a series of stemmer blades circularly arranged around the periphery of the support, and means for moving said blades in said support to project them substantially radially of the support to cause them to collectively operate to sever the web and minor ribs of a leaf from its stem by a rapid succession of short stripping movements along the stem and for reversing the movement of each blade to withdraw it from contact with the leaf immediately after action thereon.

36. In a tobacco stemming machine, the combination with means for supporting a leaf to be stemmed, of a pair of oppositely disposed substantially cylindrical supports, means for rotating the supports, two series of stemmer blades one series being circularly arranged and pivoted at the periphery of each support, and means for swinging said blades in their respective supports to project them substantially radially of the support to cause them to collectively operate to sever the web and minor ribs of a leaf from its stem by a rapid succession of short stripping movements along the stem and for reversing the movement of each blade to withdraw it from contact with the leaf immediately after action thereon.

37. In a tobacco stemming machine, the combination with means for supporting a leaf to be stemmed, of a support, means for moving the support, a series of stemmer blades mounted in the support, and means for moving said blades in said support to project them substantially radially of the support to cause them to collectively operate to sever the web and minor ribs of a leaf from its stem by a rapid succession of short stripping movements along the stem and for tilting the blades to produce a reverse relative movement of the leaf and each blade immediately after its stripping movement to prevent injury to the stripped leaf.

38. In a tobacco stemming machine, the combination with a rotary member of longitudinally arranged blades having notches provided with transverse stripping edges arranged in a spiral stem-way, of a carrier for a leaf to be stemmed, and means for producing a relative angular movement of the member and carrier whereby the lamina and stem are separated by the stripping edges.

39. In a tobacco stemming machine, the combination with a rotary member of longitudinally arranged blades having notches provided with transverse stripping edges arranged in a spiral stem-way, of a carrier for a leaf to be stemmed, and means for producing a relative angular movement of the member and carrier whereby the lamina and stem are separated by the stripping edges.

40. In a tobacco stemming machine, the combination with a rotary member of longitudinally arranged blades having notches provided with transverse stripping edges arranged in a spiral stem-way, of a carrier for a leaf to be stemmed, and means for moving the carrier at an angle to the rotary member whereby the lamina and stem are separated by the stripping edges.

41. In a tobacco stemming machine, the combination with a rotary member having a spiral stem-way provided with transverse stripping edges, of two carriers for a leaf to be stemmed arranged in tandem the one delivering the leaf automatically to the other, and means for producing a relative angular movement of the carriers and member whereby the lamina and stem are separated by the stripping edges.

42. In a tobacco stemming machine, the combination with a rotary member having a spiral stem-way provided with transverse stripping edges, of two chain carriers for a leaf to be stemmed said carriers being arranged in tandem and each provided with grippers the one carrier operating automatically to deliver a leaf to the other carrier, and means for moving the carriers at an angle to the member whereby the leaf and stem are separated by the stripping edges.

43. In a tobacco stemming machine, the combination with a member comprising longitudinally arranged blades having notches provided with transverse stripping edges arranged in a spiral stem-way and rotating on a substantially horizontal axis, of a carrier for a leaf to be stemmed, and means for moving the carrier in a path inclined from the horizontal whereby the leaf and stem are separated by the stripping edges.

44. In a tobacco stemming machine, the combination with a member comprising longitudinally arranged blades having notches provided with transverse stripping edges arranged in a spiral stem-way and rotating on a substantially horizontal axis, of two carriers for a leaf to be stemmed arranged in tandem the one operating automatically to deliver leaves to the other, and means for moving said carriers in a path inclined from the horizontal whereby the leaf and stem are separated by the stripping edges.

45. In a tobacco stemming machine, the combination with a member comprising longitudinally arranged blades having notches provided with transverse stripping edges arranged in a spiral stem-way and rotating on a substantially horizontal axis, of a carrier for a leaf to be stemmed, and means for moving the carrier in a path inclined from the horizontal and at one side of said member whereby the leaf and stem are separated by the stripping edges.

46. In a tobacco stemming machine, the combination with a leaf carrier having means for gripping a stem, of a pair of rotary stripping members inclined relative to the carrier and constructed of longitudinally arranged blades having notches provided with transverse stripping edges arranged in a spiral stem-way through which the stem passes substantially from butt to tip along the members.

47. In a tobacco stemming machine, the combination with a leaf carrier having means for gripping a stem and advancing a leaf in a pendent position, of a pair of stripping members rotatable on substantially horizontal axes and constructed of longitudinally arranged blades having notches provided with transverse stripping edges arranged in a spiral stem-way through which the stem passes substantially from butt to tip along the members, and means for moving the leaf carrier in a path inclined from the horizontal and extending above the spiral stem-way.

48. In a tobacco stemming machine, the combination with means for supporting a leaf to be stemmed, of a support, means for moving the support, a series of stemmer blades mounted in the support, and means including a cam and operative connections for moving said blades in said support to project them substantially radially of the support to cause them to collectively operate to sever the lamina and minor ribs of a leaf from its stem by a rapid succession of short stripping movements along the stem and for tilting said blades for reversing the movement of each blade to withddraw it from contact with the leaf immediately after action thereon.

49. In a tobacco stemming machine, the combination with means for supporting a leaf to be stemmed, of a support, means for moving the support, a series of stemmer blades mounted in the support, and means including a cam and a series of coöperating arms one connected with each blade for moving said blades in said support to project them substantially radially of the support to cause them to collectively operate to sever the lamina and minor ribs of a leaf from its stem by a rapid succession of short stripping movements along the stem, and for tilting said blades for reversing the movement of each blade to withdraw it from contact with the leaf immediately after action thereon.

50. In a tobacco stemming machine, the combination with means for supporting a leaf to be stemmed, of a support, means for rotating the support, a series of stemmer blades pivoted at the periphery of the support, and means including a stationary cam and coöperating arms one secured to each blade for moving said blades in said support to project them substantially radially of the support to cause them to collectively operate to sever the web and minor ribs of a leaf from its stem by a rapid succession of short stripping movements along the stem and for producing a reverse relative movement of the leaf and each blade immediately after its stripping movement.

51. In a tobacco stemming machine, the combination with leaf strippers, of a carrier adapted to engage the stems of leaves for supporting and advancing the same while being acted upon by said strippers, and brushes rotating beneath said strippers for disentangling the leaves prior to and during the action of said strippers upon the disentangled part of the leaves.

52. In the stripping mechanism of a tobacco stemming machine, the combination with a forwarding chain, of sprockets over which said chain runs, a series of stem grippers mounted in the chain, a series of springs one for normally holding each gripper in closed position, a series of reciprocating plungers mounted in one sprocket and adapted for intermittent contact with said grippers, and means for operating the plungers as the grippers successively pass over said sprocket to open the grippers at this point.

53. In the stripping mechanism of a tobacco stemming machine, the combination with a forwarding chain, of sprockets over which said chain runs, a series of stem grippers mounted in the chain, a series of springs one for normally holding each gripper in closed position, a series of reciprocating plungers mounted in one sprocket and adapted for intermittent contact with said grippers, and cams for operating the plungers as the grippers successively pass over said sprocket to open the grippers at this point.

54. In a tobacco stemming machine, the combination with a primary forwarding chain, of sprockets over which said chain runs, a series of stem grippers carried by the chain, means for normally holding said grippers in closed position, means coöperating with the sprockets for opening the grippers as they successively pass over the sprockets, a secondary forwarding chain the operating run of which overlaps the operating run of the gripper chain said secondary forwarding chain being provided with clips arranged to automatically seize a leaf stem before it is released by one of the chain grippers and carry it to a point beyond the range of action of the gripper chain.

55. In a tobacco stemming machine, the combination with a primary forwarding chain, of primary sprockets rotating in vertical planes and over which said chain runs, a series of stem grippers mounted in the chain, means for normally holding said grippers in closed position, means coöperating with said sprockets for opening the grippers as they successively pass over said sprockets, a pair of secondary sprockets rotating in planes at an angle to that of the gripper chain sprockets, a secondary forwarding chain overrunning said secondary sprockets and provided with clips adapted to automatically seize the stem of a leaf carried by one of the grippers before said gripper is opened and for carrying the leaf beyond the range of action of the gripper chain.

56. In a tobacco stemming machine, the combination with leaf strippers comprising a series of separated and successively acting blades and operating connections, of a reciprocating member coöperating with one of said blades to sever a stem at a point of predetermined thickness only.

57. In a tobacco stemming machine, the combination with leaf strippers comprising a series of separated and successively acting blades and operating connections, of a reciprocating knife coöperating with one of said blades to sever the stem at a point of predetermined thickness only.

58. In a tobacco stemming machine, the combination with a leaf stripping rotary member having a plurality of axial peripheral ribs and a spiral diminishing stem-way formed in the ribs, of a reciprocating knife provided with a plurality of stem receiving notches coöperating with one of said ribs to sever a stem at a point of predetermined thickness only.

59. In a tobacco stemming machine, the combination with a leaf stripping rotary member having a plurality of axial peripheral ribs and a spiral diminishing stem-way formed in the ribs, of a reciprocatory knife provided with a plurality of stem receiving notches coöperative with one of said ribs to sever a stem at a point of predetermined thickness only, and cam actuated mechanism for reciprocating the knife at one point only during the rotation of the rotary member.

60. In a tobacco stemming machine, the combination with leaf stemming mechanism, of stem severing means associated therewith and provided with a series of stem receiving notches of progressively decreasing size and adapted to act substantially at the end of the stemming operation.

61. In a tobacco stemming machine, the combination with stripping mechanism, of stem severing means associated therewith and including operative connections and a pair of coöperating blades each having stem receiving notches progressively decreasing in size and adapted to act substantially at the end of the stemming operation.

62. In a tobacco stemming machine, the combination with stripping mechanism, of stem severing means associated therewith and including operating connections and a stationary blade and a movable blade said blades being provided with coöperating stem receiving notches progressively decreasing in size and adapted to act substantially at the end of the stemming operation.

63. In a tobacco stemming machine, leaf feeding means comprising means for advancing leaves, and means for threshing the butts of the leaves to straighten and separate the leaf stems and to clean the laminæ from the stem butts while the leaves are advancing.

64. In a tobacco stemming machine, leaf feeding means comprising means for advancing leaves, means coöperating with the advancing means for holding the leaves upon said advancing means against displacement during a portion of its movement, and means for threshing the butts of the leaves to straighten and separate the leaf stems and to clean the laminæ from the stem butts while the leaves are advancing.

65. In a tobacco stemming machine, leaf feeding means comprising a feed belt for advancing leaves, a pressure belt for holding the leaves on the feed belt against displacement during a part of its movement, and means for threshing the butts of the leaves to straighten and separate the leaf stems and to clean the laminæ from the stem butts while the leaves are advancing.

66. In a tobacco stemming machine, the combination with a feed belt for advancing a leaf sidewise with its butt end overhanging the belt, of a pressure belt for holding the leaf on the feed belt against displacement during a part of its movement, a pair of members located one on either side of the path of the advancing leaf butt, means for rotating said members at high speed, and a series of flails mounted in each member and projected substantiallly radially therefrom by centrifugal force for threshing the butt of the leaf to separate its lamina from its stem while said leaf is advanced by the feed belt and held by the pressure belt.

67. In a tobacco stemming machine, the combination with a feed belt adapted to advance a bundle of tobacco leaves sidewise with their butt ends overhanging the belt, of a pressure belt for holding the leaves on the feed belt against displacement during a part of their movement, a casing mounted alongside the feed belt and provided with a stem-way for the overhanging butts of the leaves, a pair of members journaled in the casing one on either side of its stem-way, means for rotating said members at high speed, and a series of flails mounted in each member and projected substantially radially therefrom by centrifugal force for threshing the butts of the leaves to straighten them and to separate their laminæ from their stems.

68. In a tobacco stemming machine, the combination with two coöperating series of forwarding members separated and arranged to form a stem-way for leaves moving in a direction at an angle to their stems, of means for driving the members of each series at progressively increasing speeds, and means for presenting leaves to and supporting them during the operation of said forwarding members.

69. In a tobacco stemming machine, the combination with two coöperating series of forwarding members separated and arranged to form a stem-way for leaves moving in a direction at an angle to their stems, means for driving the members of each series at progressively increasing speeds, and a feed belt adapted to present leaves to and support them during the operation of said forwarding members.

70. In a tobacco stemming machine, the combination with feed mechanism, of a stem butt separator comprising two coöperating series of forwarding rolls separated and arranged to form a stem-way, and gearing for imparting a progressively increasing speed to the rolls of each series.

71. In a tobacco stemming machine, the combination with two superposed series of forwarding members separated and arranged to form a stem-way, means for driving the members of each series at progressively increasing speeds, and feed mechanism for presenting leaves to and supporting them during the operation of said forwarding members.

72. In a tobacco stemming machine, the combination with two superposed series of forwarding rolls separated and arranged to form a tortuous stem-way, means for driving the members of each series at progressively increasing speeds, and a feed belt the operating run of which is just below the mean plane of the stem-way and which operates to present leaves to and support them during the operation of said forwarding rolls.

73. In a tobacco stemming machine, the combination with two coöperating series of forwarding members separated and arranged to form a stem-way, means for driving the members of each series at progressively increasing speeds, a feed belt for presenting leaves to and supporting them during the operation of said forwarding members, and means for intermittently stopping the driving means.

74. In a tobacco stemming machine, the combination with two coöperating series of forwarding members separated and arranged to form a stem-way, means for driving the members of each series at progressively increasing speeds, a feed belt for presenting leaves to and supporting them during the operation of said forwarding members, and means controlled by a stem in the stem-way for intermittently stopping the driving means.

75. In a tobacco stemming machine, the combination with two coöperating series of forwarding rolls separated and arranged to form a stem-way, means for driving the rolls of each series at progressively increasing speeds, a feed belt for presenting leaves to and supporting them during the operation of said forwarding rolls, and means controlled by a stem in the stem-way for intermittently stopping the driving means and feed belt.

76. In a tobacco stemming machine, the combination with feed mechanism, of a stem butt separator, means for automatically interrupting the operation of the separator when a leaf is at the discharge end thereof, means for removing said leaf from the separator, and means for automatically releasing the separator for operation when said leaf is removed therefrom.

77. In a tobacco stemming machine, the combination with feed mechanism, of a stem butt separator, means for automatically interrupting the operation of the separator when a leaf is at the discharge end thereof, stem-clips for removing said leaf from the separator, and means for automatically releasing the separator for operation when said leaf is removed therefrom.

78. In a tobacco stemming machine, the combination with means for feeding a bunch of leaves, of means engaging and acting on the stem butts for spacing the latter and delivering them successively.

79. In a tobacco stemming machine, the combination with means for feeding a bundle of leaves, of means for disposing the stem butts substantially in a plane and for spacing the stem butts in such plane and delivering them successively.

80. In a tobacco stemming machine, the combination with means for feeding bundles of leaves in a direction at an angle to their stems, of means engaging and acting on the stem butts for straightening and threshing them to separate the laminæ from said stem butts and for disposing and spacing the stem butts substantially in a plane.

81. In a tobacco stemming machine, the combination with a belt for feeding bundles of leaves, of means engaging and acting on the stem butts for straightening and threshing them to separate the laminæ from said stem butts and for disposing and spacing the stem butts substantially in a plane.

82. In a tobacco stemming machine, the combination with means for feeding bundles of leaves, of means engaging and acting on the stem butts for straightening and threshing them to separate the laminæ from said stem butts and for disposing and spacing the stem butts substantially in a line, and means for delivering the stem butts successively from such line in a plane different from that of the feeding means.

83. In a tobacco stemming machine, the combination with means for feeding bundles of leaves in substantially horizontal position, of means engaging and acting on the stem butts for straightening and threshing them to separate the laminæ from said stem butts and for disposing the stem butts substantially in a plane, and means for successively delivering them from such plane in substantially vertical position.

84. In a tobacco stemming machine, the combination with means for feeding leaves, of means engaging and acting on the stem butts for straightening and threshing them to separate the laminæ from the stem butts, and spacing means engaging and acting on the threshed stem butts for separating the latter and delivering them successively.

85. In a tobacco stemming machine, the combination with means for feeding bundles of leaves, of means engaging and acting upon the stem butts for straightening and threshing them to separate the laminæ from the stem butts, spacing means for disposing the stem butts substantially in a plane.

86. In a tobacco stemming machine, the combination with means for feeding bundles of leaves in substantially horizontal position, means for straightening and threshing the stem butts to separate the laminæ from the stem butts, means for disposing the stem butts substantially in a plane, and means for successively delivering them from such plane and turning them to substantially vertical position.

87. In a tobacco stemming machine, the combination with means for supporting a leaf, of means for threshing the butt end of the leaf to separate the lamina from the stem butt, means for stripping the major portion of the lamina from the stem, forwarding means having devices adapted to engage the threshed butt end of the stem and thereby carry the leaf into the range of action of the stripping means.

88. In a tobacco stemming machine, the combination with means for supporting a bundle of leaves, of means for threshing the butt ends of the leaves to separate the laminæ from the stem butts, means for stripping the major portion of the laminæ of the leaves from the stems by a rapid succession of short stripping movements along the stem, and forwarding means having devices adapted to engage the threshed stem butts and thereby carry them into the range of action of the stripping means.

89. In a tobacco stemming machine, the combination with means for feeding a bundle of leaves, of coöperating means for threshing the butt ends of the leaves to separate the laminæ from the stem butts during the feeding movement, means for stripping the major portion of the laminæ from the stems by a rapid succession of short stripping movements, and forwarding means having devices adapted to engage the threshed stem butts and thereby carry the leaves into the range of action of the stripping means.

90. In a tobacco stemming machine, the combination with means for supporting tobacco leaves substantially in horizontal position, of means for threshing the butt ends of the leaves to separate the laminæ from the stem butts while in horizontal position, means for stripping the major portion of the laminæ from the stems, and forwarding means having devices adapted to engage the threshed stem butts and deliver the leaves in pendent position into the range of action of the stripping means.

91. In a tobacco stemming machine, the combination with leaf treating mechanism comprising means for supporting and carrying a bundle of leaves, of means for threshing the butt ends of the leaves to straighten and separate the stem butts and to separate the laminæ from the stem butts, and means receiving the leaves and thereafter stripping the major portion of the laminæ from the stems.

92. In a tobacco stemming machine, the combination with means for supporting a bundle of leaves, of means for threshing the butt ends of the leaves to separate the laminæ from the stem butts, means for separating the stem butts, means for stripping the major portion of the laminæ from the stems, and forwarding means having devices adapted to engage the threshed and separated stem butts for carrying the leaves successively into the range of action of the stripping means.

93. In a tobacco stemming machine, the combination with means for supporting a bundle of leaves substantially in horizontal position, of means for threshing the butt ends of the leaves to separate the laminæ from the stem butts, means for separating the threshed stem butts while the leaves are substantially in horizontal position, means for stripping the major portion of the laminæ from the stems, and forwarding means having devices adapted to engage the threshed and separated stem butts in horizontal position and thereby deliver the leaves successively into the range of action of the stripping means and substantially in pendent position.

94. In a tobacco stemming machine, the combination with feed mechanism adapted to support and advance leaves, of means for stripping the major portion of the laminæ from the stems said means including operating connections and a carrier for supporting the leaves to be stemmed, and a turning carrier interposed between the feed mechanism and the stripping means for receiving leaves from the feed mechanism and delivering them to the carrier of the stripping means said turning carrier being also adapted to turn the leaves in transit and deliver them to the stripping means in a plane other than that in which they are received from the feed mechanism.

95. In a tobacco stemming machine, the combination with feed mechanism adapted to support and advance leaves in a horizontal position, means for stripping the major portion of the laminæ of the leaves from the stems and including operating connections and a carrier for supporting the leaves to be stemmed in a substantially vertical position, and a turning carrier interposed between the feed mechanism and the stripping means and adapted to receive leaves from the feed mechanism while said leaves are lying in substantially horizontal position and to turn said leaves in transit and deliver them in substantially vertical position to the carrier of the stripping means.

96. In a tobacco stemming machine, the combination with feed mechanism adapted to support leaves in substantially horizontal position, of means for stripping the major portion of the laminæ from the stems said means including operating connections and a carrier adapted to support leaves in substantially vertical position, and a rotating turning carrier having devices adapted to receive leaves in the position in which they lie in the feed mechanism and to deliver them to the carrier of the stripping means in the position in which they lie in said carrier.

97. In a tobacco stemming machine, the combination with means for stripping the major portion of the laminæ from the stems of leaves comprising stripping means and means for gripping leaf stems and carrying them through the stripping means, of leaf feeding means comprising means for receiving leaves in a substantially horizontal position, and means for turning the leaves to a substantially vertical position and for presenting their stems to the gripping means.

98. In a tobacco stemming machine, the combination with means for stripping the major portion of the laminæ from the stems of leaves comprising stripping means and means for gripping leaf stems and carrying them through the stripping means, of leaf feeding means comprising means for receiving a plurality of leaves in substantially horizontal position and carrying them toward the stripping means, means for gripping the stems singly adjacent their butt ends and turning them into a substantially vertical position and presenting them in the latter position to the gripping means.

99. In a tobacco stemming machine, the combination with means for stripping the major portion of the laminæ from the stems of leaves comprising stripping means and means for gripping leaf stems and carrying them through the stripping means, of leaf feeding means comprising means for receiving a plurality of leaves in substantially horizontal position and carrying them toward the stripping means, means for gripping the stems singly adjacent their butt ends and turning them into substantially vertical position and presenting them successively to the gripping means in an angular position with the butt of each leaf in advance of other portions thereof.

100. In a tobacco stemming machine, the combination with leaf treating mechanism comprising means for supporting a bundle of leaves, means for threshing the butt ends of the leaves to straighten and separate the stem butts and to clean the laminæ from the stem butts, means for guiding the stem butts into the range of action of the threshing means, and means for receiving the leaves and thereafter stripping the major portion of the laminæ from the stems.

101. In a tobacco stemming machine, the combination with means for threshing the butt ends of the leaves to separate the laminæ from the stem butts, of means for feeding and guiding the stem butts into the range of action of the threshing means, means spaced from the threshing means for stripping the major portion of the laminæ from the stems, and means for forwarding the leaves from the threshing means to the stripping means.

102. In a tobacco stemming machine, the combination with means adapted to support and advance a bundle of leaves, of means for threshing the butt ends of the leaves to separate the laminæ from the stem butts, spacing means for separating the threshed stem butts, means for feeding and guiding the stem butts into the range of action of the threshing means and thence to the stem butt separating means, means spaced from the separating means for stripping the major portion of the laminæ from the stems, and means for forwarding leaves singly from the separating means to the stripping means.

103. In a tobacco stemming machine, the combination with mechanism adapted to separate and advance a bundle of leaves in substantially horizontal position, means for threshing the butt ends of the leaves to separate the laminæ from the stem butts, spacing means for separating the threshed stem butts, means for feeding and guiding stem butts into the range of action of the threshing means and thence into the range of action of the spacing means, means spaced from the spacing means for stripping the major portion of the laminæ from the stems while the leaves are in substantially vertical position, and means for receiving leaves singly in substantially horizontal position from the separating means and turning and delivering them to the stripping means in substantially vertical position.

104. In a tobacco stemming machine, the combination with mechanism adapted to support and advance a bundle of leaves, of means coöperating with the feed mechanism for threshing the butt ends of the leaves to straighten the stem butts and separate the laminæ therefrom while the leaves are advancing, spacing means for separating the threshed stem butts, means for feeding and guiding the stem butts into the range of action of the threshing means and thence into the range of action of the stem butt spacing means, means spaced from the spacing means for stripping the major portion of the laminæ from the stems, and means for forwarding leaves singly from the spacing means to the stripping means.

105. In a tobacco stemming machine, the combination with mechanism adapted to support and advance a bundle of leaves, of means coöperating with the feed mechanism for threshing the butt ends of the leaves to straighten the stem butts and separate the laminæ therefrom, spacing means for separating the threshed stem butts, means for feeding and guiding the stem butts into the range of action of the threshing means and thence into the range of action of the spacing means, means spaced from the spacing means for stripping the major portion of the laminæ from the stems, means for forwarding leaves from the separating means to the stripping means, and intermittently operating means for controlling the delivery of leaves from the separating means to the transferring means.

106. In a tobacco stemming machine, the combination with means for supporting and advancing bundles of leaves in irregular formation, of a stripping mechanism comprising stripping means and means for gripping leaf stems and carrying them through the stripping means, means for arranging the leaves of the bundle in regular formation, and means for forwarding the leaves singly and successively from the arranging means to the gripping mechanism.

107. In a tobacco stemming machine, the combination with means for supporting and advancing bundles of leaves in irregular formation, of a stripping mechanism comprising stripping means and means for gripping leaf stems and carrying them through the stripping means, means for arranging the leaves of the bundle in regular formation, and means for forwarding the leaves singly and successively from the arranging means to the gripping mechanism and for changing their position in transit.

108. In a tobacco stemming machine, the combination with preliminary leaf treating means for stripping a portion of the webs of leaves from the butts of their stems and for straightening said stems, of means receiving and engaging the stripped butts, and means coöperating with the butt engaging means to strip the remaining portion of the webs from the stems.

109. In a tobacco stemming machine, the combination with preliminary leaf treating means for stripping the minor portion of the webs of leaves from the butts of their stems and for straightening said stems, of means receiving and engaging the stripped butts, and means coöperating with the butt engaging means to strip the major portion of the webs from the stems.

110. In a tobacco stemming machine, the combination with preliminary leaf treating means for simultaneously stripping a portion of the webs of leaves from the butts of their stems and for straightening said stems, of means receiving and engaging the stripped butts, and means coöperating with the butt engaging means to strip the remaining portion of the webs from the stems.

111. In a tobacco stemming machine, the combination with preliminary leaf treating means for stripping a portion of the webs of leaves from the butts of their stems and for straightening said stems, of means receiving, engaging and forwarding the stripped butts, and means coöperating with the butt engaging and forwarding means to strip the remaining portion of the webs from the stems.

112. In a tobacco stemming machine, the combination with preliminary leaf treating means for stripping a portion of the webs of leaves from the butts of their stems and for straightening said stems, of means receiving, engaging and forwarding the stripped butts, and means coöperating with the butt engaging and forwarding means to strip the remaining portion of the webs from the stems the stripping mechanisms being arranged at different angles with respect to the line of travel of the leaves through the machine.

113. In a tobacco stemming machine, the combination with means for feeding a plurality of leaves, of coöperating preliminary leaf treating means for stripping a portion of the webs of leaves from the butts of their stems and for straightening said stems, means receiving and engaging the stripped butts and means coöperating with the butt engaging and forwarding means to strip the remaining portion of the webs from the stems.

114. In a tobacco stemming machine, the combination with a traveling belt for feeding a plurality of leaves, of coöperating preliminary leaf treating means for stripping a portion of the webs of leaves from the butts of their stems and for straightening said stems, means receiving and engaging the stripped butts, and means coöperating with the butt engaging and forwarding means to strip the remaining portion of the webs from the stems.

115. The combination with means for horizontally supporting and advancing a bunch of tobacco leaves, of means for turning the leaves to vertical position, means traveling in an inclined path for forwarding the leaves away from the turning means, and stripping devices co-acting with said traveling means.

In testimony whereof I have hereunto set my hand in presence of two subscribing witnesses.

CHARLES V. STRICKLAND.

Witnesses:
 GEORGE PALMER STACY,
 L. A. HAMMERSLEY.

Correction in Letters Patent No. 1,301,193

It is hereby certified that Letters Patent No. 1,301,193, granted April 22, 1919, upon the application of Charles V. Strickland, of Brooklyn, New York, for an improvement in "Tobacco-Stemming Machines," were erroneously issued to the inventor, said Strickland, whereas said Letters Patent should have been issued to *Standard Tobacco Stemmer Company, of Richmond, Virginia, a corporation of Virginia*, said corporation being assignee of the entire interest in said invention, as shown by the records of assignments in this office; and that the said Letters Patent should be read with this correction therein that the same may conform to the record of the case in the Patent Office.

Signed and sealed this 22d day of July, A. D., 1919.

[SEAL.]

R. F. WHITEHEAD,
*Acting Commissioner of Patents.*

Cl. 131—57.